United States Patent
Buckland et al.

(10) Patent No.: US 12,367,439 B2
(45) Date of Patent: Jul. 22, 2025

(54) SWARM BASED ORCHARD MANAGEMENT

(71) Applicant: Bovi, Inc., Dover, DE (US)

(72) Inventors: Lucas Thorne Buckland, Rocklin, CA (US); Connor Quinn Buckland, Rocklin, CA (US)

(73) Assignee: BOVI, INC., Dover, DE (US)

( * ) Notice: Subject to any disclaimer, the term of this patent is extended or adjusted under 35 U.S.C. 154(b) by 116 days.

(21) Appl. No.: 17/867,307

(22) Filed: Jul. 18, 2022

(65) Prior Publication Data
US 2023/0025714 A1    Jan. 26, 2023

Related U.S. Application Data

(60) Provisional application No. 63/222,604, filed on Jul. 16, 2021, provisional application No. 63/222,611, filed on Jul. 16, 2021.

(51) Int. Cl.
*G06Q 10/0631* (2023.01)
*A01B 69/00* (2006.01)
(Continued)

(52) U.S. Cl.
CPC ..... *G06Q 10/06316* (2013.01); *A01B 69/001* (2013.01); *A01B 69/008* (2013.01);
(Continued)

(58) Field of Classification Search
CPC ... A01B 69/001; A01B 69/008; A01B 79/005; A01B 79/02; A01D 46/30; G05D 1/0044;
(Continued)

(56) References Cited

U.S. PATENT DOCUMENTS

| | | | |
|---|---|---|---|
| 10,123,473 B2 | 11/2018 | Cavender-Bares et al. | |
| 2006/0213167 A1* | 9/2006 | Koselka | A01B 79/005 56/10.2 A |

(Continued)

FOREIGN PATENT DOCUMENTS

| | | | | |
|---|---|---|---|---|
| CN | 103701850 A | * | 4/2014 | H04L 29/08 |
| CN | 109191074 A | * | 1/2019 | G06Q 10/103 |
| KR | 20220162483 A | * | 6/2021 | B25J 15/0052 |

OTHER PUBLICATIONS

Ayaz et al., "Internet-of-Things (IoT)-Based Smart Agriculture: Toward Making the Fields Talk", Special Section on New Technologies for Smart Farming 4.0: Research Challenges and opportunities. IEEE Access, vol. 7, 2019. (Year: 2019).*
(Continued)

*Primary Examiner* — Pan G Choy
(74) *Attorney, Agent, or Firm* — Gates & Cooper LLP

(57) ABSTRACT

A method and system provide the ability to manage an orchard. Sensor data that represents a first state of the orchard is captured via one or more sensors. The sensor data is captured as the one or more sensors are traveling through the orchard. An almanac is maintained. The almanac provides a state library of sequential states of a representative orchard and a task library for one or more tasks to be performed to transition between the sequential states. A task manager queries the almanac to identify a first task of the one or more tasks and allocates the first task to one or more robots that perform the first task.

18 Claims, 28 Drawing Sheets

(51) Int. Cl.

| | |
|---|---|
| *A01B 69/04* | (2006.01) |
| *A01B 79/00* | (2006.01) |
| *A01B 79/02* | (2006.01) |
| *A01D 46/30* | (2006.01) |
| *G05D 1/00* | (2024.01) |
| *G05D 1/225* | (2024.01) |
| *G05D 1/617* | (2024.01) |
| *G05D 1/65* | (2024.01) |
| *G06N 3/084* | (2023.01) |

(52) U.S. Cl.
CPC ............ *A01B 79/005* (2013.01); *A01B 79/02* (2013.01); *A01D 46/30* (2013.01); *G06N 3/084* (2013.01); *G05D 1/0044* (2013.01); *G05D 1/0214* (2013.01); *G05D 1/0223* (2013.01); *G05D 1/225* (2024.01); *G05D 1/617* (2024.01); *G05D 1/65* (2024.01)

(58) Field of Classification Search
CPC .... G05D 1/0214; G05D 1/0223; G06N 3/006; G06N 3/084; G06N 3/092; G06Q 10/06316

See application file for complete search history.

(56) References Cited

U.S. PATENT DOCUMENTS

| | | | |
|---|---|---|---|
| 2013/0174040 A1* | 7/2013 | Johnson | G06Q 10/06 715/733 |
| 2014/0030487 A1* | 1/2014 | Boyce | B32B 27/06 428/161 |
| 2015/0105965 A1 | 4/2015 | Blackwell et al. | |
| 2015/0278933 A1 | 10/2015 | Barfield, Jr. | |
| 2016/0253595 A1* | 9/2016 | Mathur | G06F 30/00 706/12 |
| 2017/0123424 A1 | 5/2017 | Cavender-Bares | |
| 2017/0349196 A1 | 12/2017 | Camarco et al. | |
| 2018/0092304 A1 | 4/2018 | Moore | |
| 2018/0242515 A1* | 8/2018 | Yajima | A01G 25/167 |
| 2018/0330435 A1* | 11/2018 | Garg | G06Q 40/03 |
| 2019/0094857 A1 | 3/2019 | Jertberg et al. | |
| 2019/0170718 A1 | 6/2019 | Miresmailli et al. | |
| 2019/0261565 A1 | 8/2019 | Robertson et al. | |
| 2020/0019777 A1* | 1/2020 | Gurzoni, Jr. | G06V 10/803 |
| 2020/0029490 A1* | 1/2020 | Bertucci | G05D 1/247 |
| 2020/0132651 A1 | 4/2020 | McPeek | |
| 2020/0281122 A1 | 9/2020 | Mor | |
| 2020/0334766 A1* | 10/2020 | Araki | A01B 79/005 |
| 2021/0000006 A1 | 1/2021 | Ellaboudy et al. | |
| 2021/0000013 A1 | 1/2021 | Robertson et al. | |
| 2021/0073692 A1* | 3/2021 | Saha | G06Q 10/06315 |
| 2022/0004175 A1* | 1/2022 | Jordan | G05B 19/41835 |
| 2022/0187847 A1* | 6/2022 | Cella | G06Q 10/06 |
| 2022/0358265 A1* | 11/2022 | Wang | G06F 30/27 |

OTHER PUBLICATIONS

Bresilla et al., "Sensors, Robotics and Artificial Intelligence in Precision Orchard Management", Alma Mater Studiorum—University di Bologna, 2019. (Year: 2019).*
PCT International Search Report & Written Opinion dated Nov. 23, 2022 for PCT Application No. PCT/US22/37470.
PCT International Search Report & Written Opinion dated Nov. 2, 2022 for PCT Application No. PCT/US22/37466.
Wang, Q., et al., "Automated Crop Yield Estimation for Apple Orchards", In Proc. International Symposium on Experimental Robotics, Jun. 2012, Quebec City, pp. 1-15.
Olsen, J.L., "Training and Pruning Your Home Orchard", revised Jul. 2011, pp. 1-13.
Weier, J., et al., "Measuring Vegetation (NDVI & EVI)", NASA Earth Observatory, Published Aug. 30, 2000, pp. 1-3, https://earthobservatory.nasa.gov/features/MeasuringVegetation.
Melgar, J.C., "Fertilization of Peach Trees", Home & Garden Information Center, Mar. 23, 2020, pp. 1-2, https://hgic.clemson.edu/fertilization-of-peach-trees/.
Wright, G.C., et al., "Pruning Citrus", University of Arizona, College of Agriculture and Life Sciences, 2008, pp. 1-4.
Renquist, S., "Fruit Thinning", Oregon State University Extension Service, Jul. 2018, pp. 1-3, https://extension.orgeonstate.edu/node/100381/printable/print.
Kalmar-Nagy, T., et al., "The Multiagent Planning Problem", Research Article, Hindawi Complexity—Wiley, vol. 2017, pp. 1-13, Revised Dec. 2016.
Non-Final Office Action dated May 7, 2024 for U.S. Appl. No. 17/867,263.
Notice of Allowance dated Sep. 5, 2024 for U.S. Appl. No. 17/867,263.

* cited by examiner

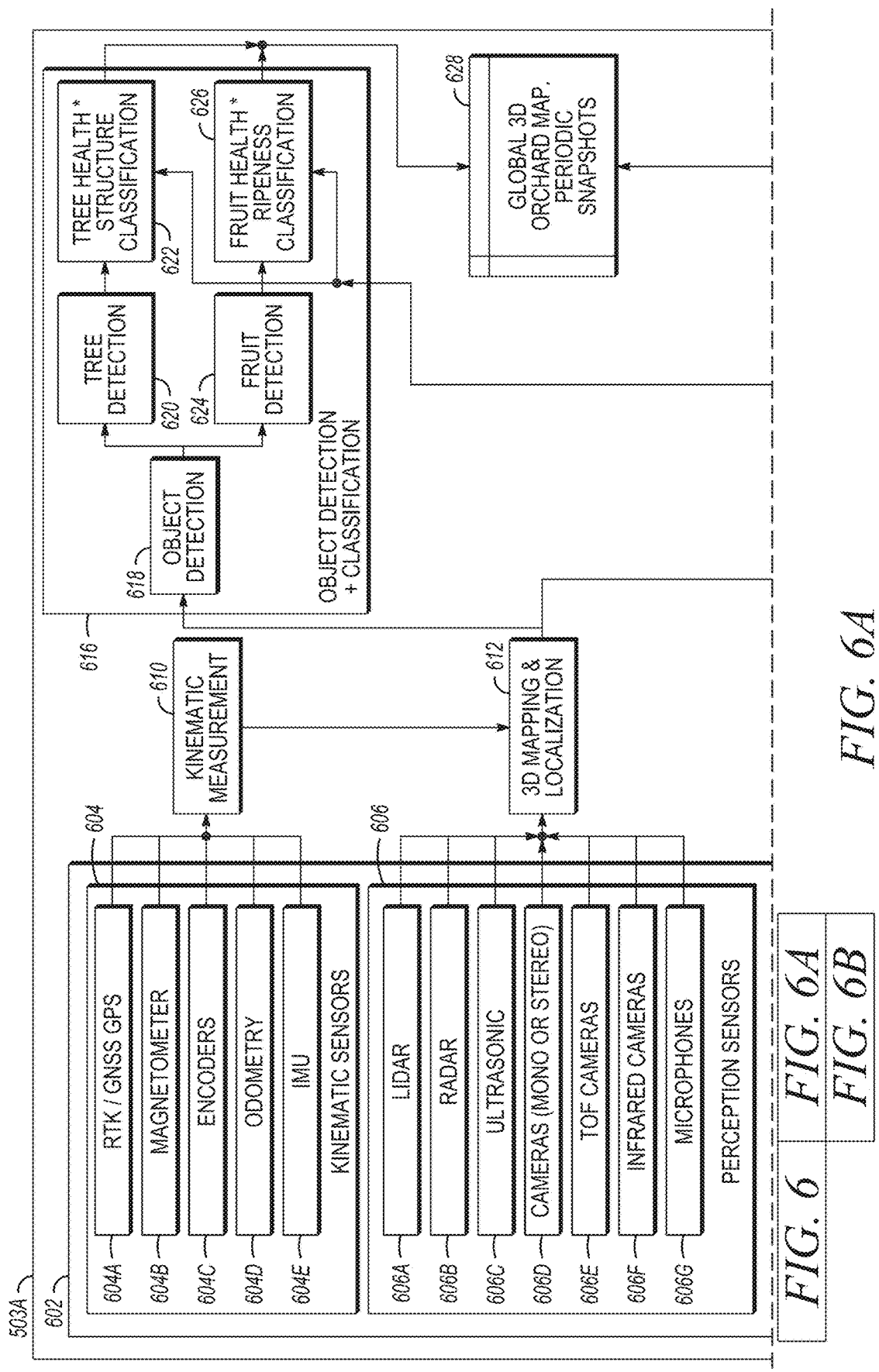

SWARM BASED ORCHARD MANAGEMENT

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

U.S. Patent Application Ser. No. 63/222,611, filed on Jul. 16, 2021, with inventor(s) Lucas Thorne Buckland and Connor Quinn Buckland, entitled "Swarm Based Orchard Management"; and U.S. Patent Application Ser. No. 63/222,604, filed on Jul. 16, 2021, with inventor(s) Lucas Thorne Buckland, Connor Quinn Buckland, and Kenneth Michael Buckland, entitled "Orchard Cart and System,".

This application is related to the following co-pending and commonly-assigned patent application(s), which application(s) is incorporated by reference herein:

U.S. patent application Ser. No. 17/867,263, filed on the same date herewith (Jul. 18, 2022), which issued Jan. 14, 2025 as U.S. Pat. No. 12,198,086 with inventor(s) Lucas Thorne Buckland and Connor Quinn Buckland, entitled "Orchard Vehicle and System", which application claims priority to U.S. Patent Application Ser. No. 63/222,604, filed on Jul. 16, 2021, with inventor(s) Lucas Thorne Buckland, Connor Quinn Buckland, and Kenneth Michael Buckland, entitled "Orchard Cart and System," and U.S. Patent Application Ser. No. 63/222,611, filed on Jul. 16, 2021, with inventor(s) Lucas Thorne Buckland and Connor Quinn Buckland, entitled "Swarm Based Orchard Management", which applications are incorporated by reference herein.

BACKGROUND OF THE INVENTION

1. Field of the Invention

The present invention relates generally to orchard management, and in particular, to a method, apparatus, and system, for managing an orchard using robotics, artificial intelligence, autonomy, and fleet management.

2. Description of the Related Art

Prior art practices involved with orchard management may be optimized for the tools historically available within the space. However, with the advent of modern technologies such as computer vision, autonomy and robotic arm manipulation, these prior art practices represent inefficiencies that are costing farmers and harvesters money and damaging the economics of agriculture.

SUMMARY OF THE INVENTION

Embodiments of the invention overcome the problems of the prior art by providing an orchard management method and system. More specifically, embodiments of the invention provide a novel system and algorithm for managing orchards that applies technology from the fields of robotics, artificial intelligence, autonomy, and fleet management, to greatly improve efficiencies within both cultural practices, and harvesting. This system and algorithm work to facilitate an artificially intelligent system to manage the operations of an orchard, and to command a swarm of robots in order to carry out these operations. It is parameterized to support both a labor-assistance model involving collaboration with humans, and a fully autonomous model involving end-to-end robotic orchard management. The algorithm offers an approximation of optimal management and harvest of orchards

BRIEF DESCRIPTION OF THE DRAWINGS

Referring now to the drawings in which like reference numbers represent corresponding parts throughout.

DETAILED DESCRIPTION OF THE INVENTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Terminology

Row: A line of trees, spaced at even intervals.

Block: A subset of the total orchard space, usually delineated by access roads.

Node: An element of the grid (e.g., a tree), or a hub, which is associated with input resources and output resources Practices: Various modes of interaction between a Worker or Robot and trees within an orchard, which may include pruning, thinning, harvesting, etc.

Tasks: Jobs that must be completed by robots within an orchard, including transfer tasks and orchard practices.

Resources: Items that are used to complete tasks, including bins, workers, fuel, tools, etc.

Operation: A large set of tasks that need to be performed on an orchard-wide scale.

Bin: An enclosure used to transport fruit, nuts, or other items within an orchard.

Robot: A wheeled or flying autonomous platform that navigates an orchard, and interacts with objects within its environment, including humans, trees, fruit, and bins.

End Effector: A tool, attached to the end of a Manipulator, which is used to interact with the environment of a robot.

Manipulator: 3-dimensional robotic arm, gantry, or otherwise capable of navigating an end effector through space, relative to a robot.

Hub: An area outside of the nearby Orchard Blocks that allows for the storage of bins, and the storage and refueling/charging of robots.

Logistics yard: A large hub, which may include the long-term storage of bins, the active use of forklifts, and the active use of long-distance haulage trucks.

Robots

As described herein, robots and humans can work together to optimally and efficiently manage an orchard. This section describes an exemplary form of a robot. However, embodiments of the invention are not intended to be limited to any particular robot or type of robot. Instead, embodiments of the invention may work agnostically with any entity that can effectively perform the actions described herein.

Figure 1:
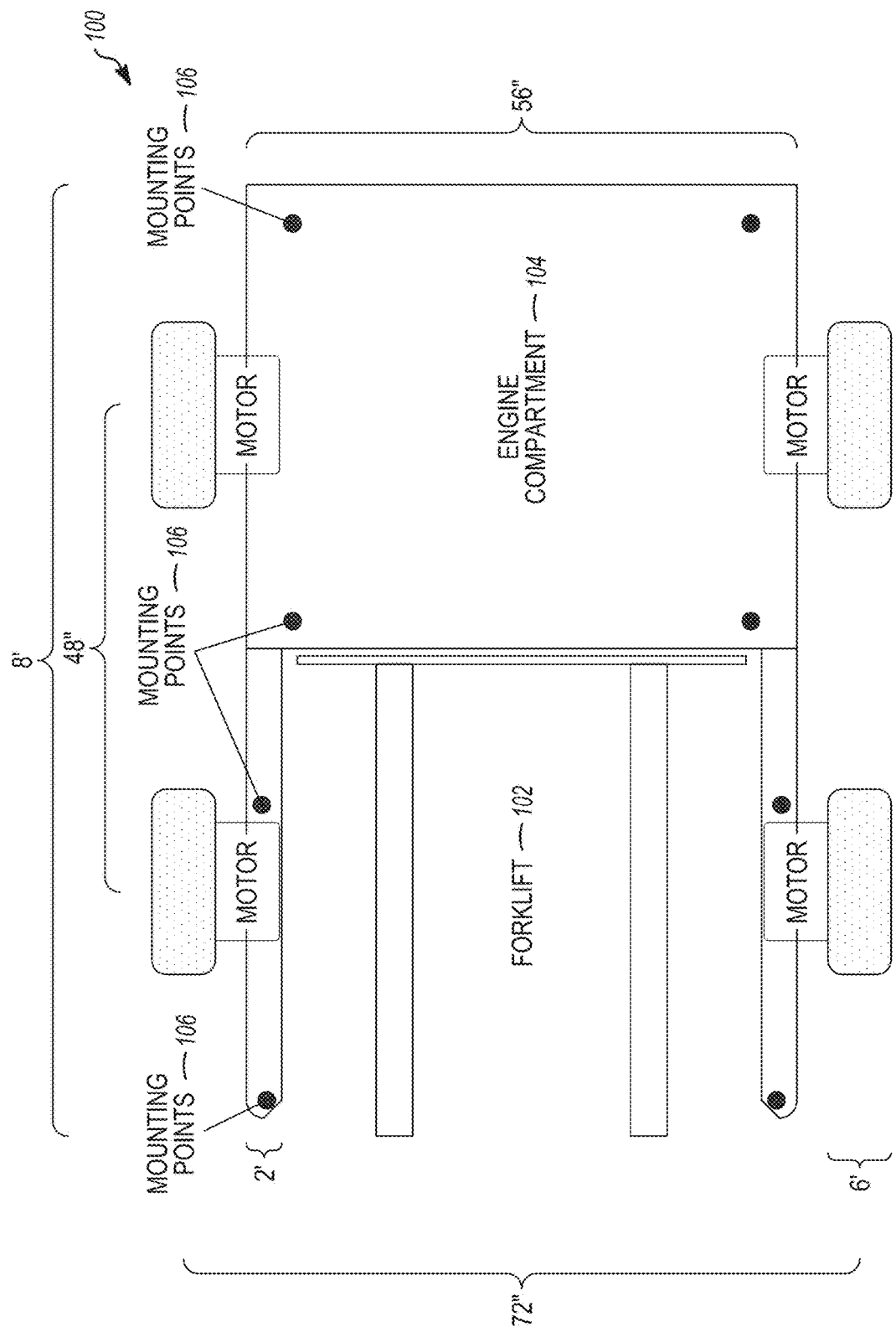
FIG. 1 illustrates a top down view of a robot platform that can be used to carry bins and assist with other tasks around an orchard in accordance with one or more embodiments of the invention.
Figure 2:
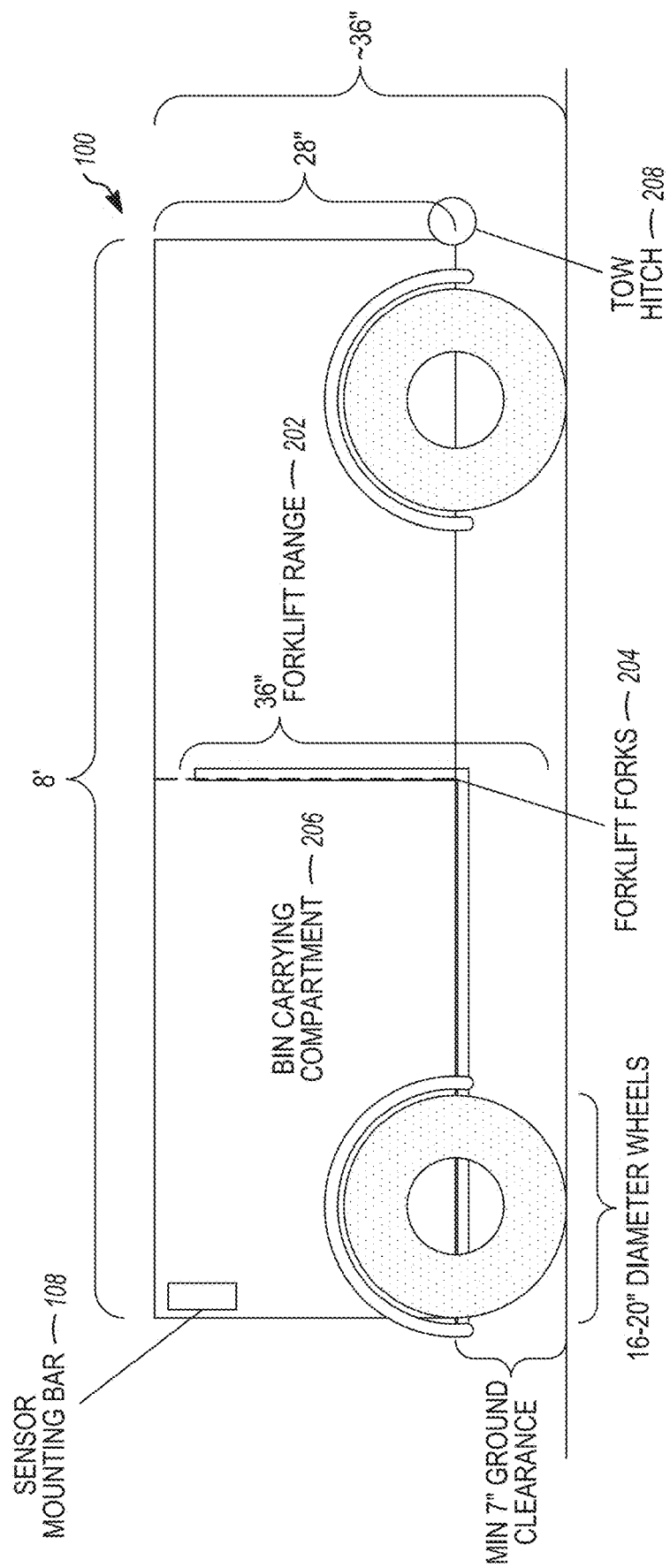
FIG. 2 illustrates a side view of a robot platform that can be used to carry bins and assist with other tasks around an orchard in accordance with one or more embodiments of the invention.

FIG. 1 and FIG. 2 illustrate a robot platform 100 that can be used to carry bins and assist with other tasks around an orchard in accordance with one or more embodiments of the invention. The forklift section 102 (illustrated in FIG. 2 via the forklift range 202 and forklift forks 204) can pick up and drop off bins (e.g., onto and off of a bin carrying compartment 206 of FIG. 2). The engine compartment section 104 of the robot 100 provides mounting points 106 for various mechanisms to aid in the management of orchards—including hydraulic ladders, platforms, sensor equipment for mapping, etc. In FIG. 2, one of the mounting points 106 may consist of a sensor mounting bar 108. In one embodiment, this robot 100 is fully autonomous (i.e., executes/performs the functions described herein without outside control/user input) and can perform many tasks around the orchard, including ferrying bins, transporting workers and assisting with picking. In another embodiment, the robot 100 navigates autonomously, and completes tasks based on periodic input from humans. Further, the robot 100 may also have a tow hitch 208 used to attaching additional components that may be towed by the robot 100.

Figure 3:
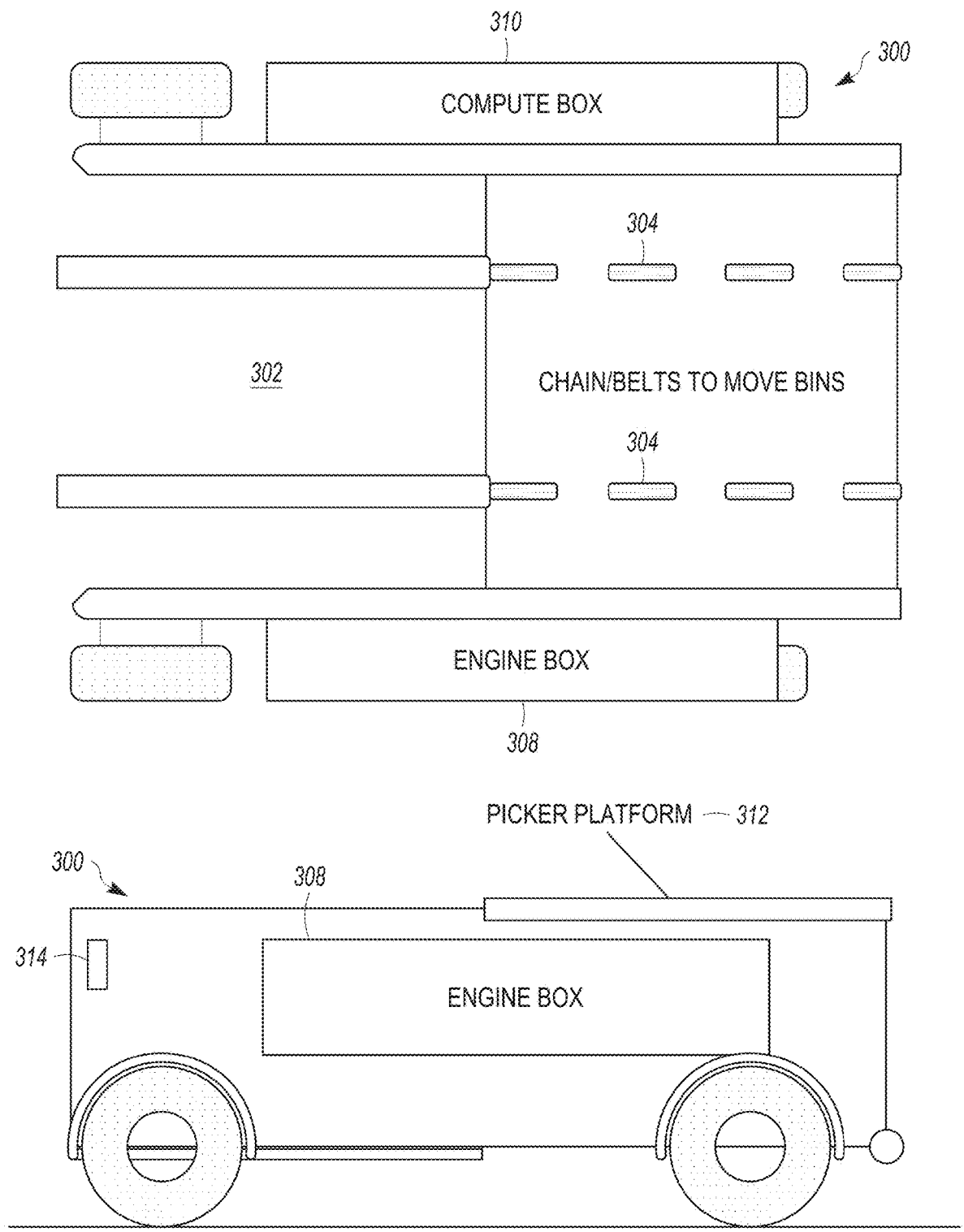
FIG. 3 shows an alternative version of a robot and allows the carrying of multiple bins in accordance with one or more embodiments of the invention.

FIG. 3 shows an alternative version of a robot 300 and allows the carrying of multiple bins in accordance with one or more embodiments of the invention. The forklift 302 may be used to pick up and drop of bins that may be moved onto a bin carrying component via chain/belts 304. In such embodiments, the engine box 306 may be moved to the side of the robot 300. Further, the compute box 310 that houses the computer for controlling the autonomous navigation may also be located on the side of the robot 300. A picker platform 312 may also be used to increase the height of the picker in the orchard (e.g., to reach crops in trees). This robot 300 shows how it could carry up to two bins, but it could be further adapted to carry any number of bins, including by attaching a bin trailer to the rear trailer hitch 314 of the robot.

Figure 4:
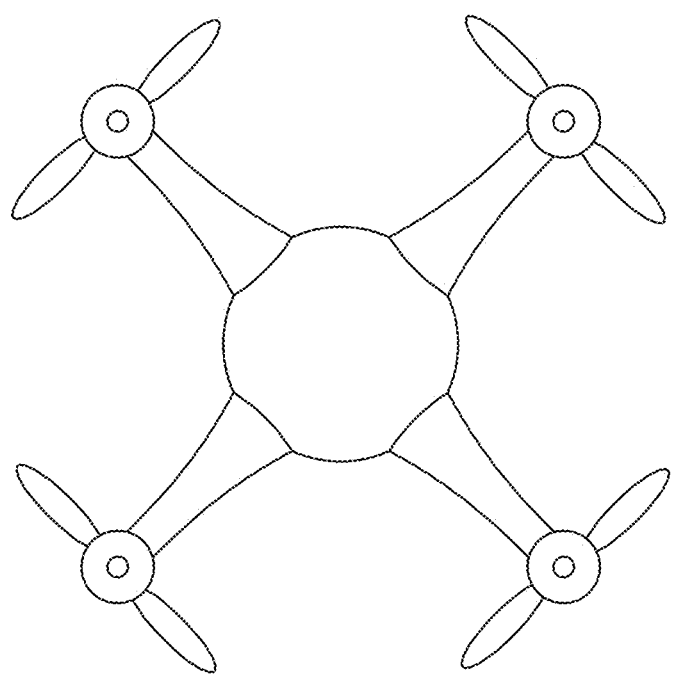
FIG. 4 shows a drone that can be used to perform various operations/tasks in an orchard in accordance with one or more embodiments of the invention.

FIG. 4 shows a drone that can be used to perform various operations/tasks in an orchard in accordance with one or more embodiments of the invention. For example, such tasks may include mapping or monitoring an orchard.

Sensors

All of the robots described above may be equipped with sensors used to observe and navigate the environment. While specific exemplary sensors are described herein, the list of sensors described herein is not exhaustive, and embodiments of the invention are sensor agnostic, and other sensors not specifically described may be utilized to gather insights about an orchard. Exemplary sensors of one or more embodiments of the invention include:

(1) Kinematic Sensors:
  RTK (real-time kinematic positioning)/GNSS GPS (global navigation satellite system/global positioning system)
  Magnetometer
  Encoders
  Odometry
  IMU (inertial measurement unit)

(2) Perception Sensors:
  Lidar
  Radar
  Ultrasonic
  Cameras
  Cameras (mono or stereo)
  Time-of-Flight (ToF) cameras
  Infrared cameras
  Microphones (3) Fruit and Tree Health Sensors:
  Cameras (mono or stereo)
  Time-of-flight cameras
  Infrared cameras
  Hyperspectral cameras
  Ultrasonic
  Load cells and scales
  NDVI (normalized difference vegetation index) sensors
  Electrochemical soil sampling sensors
  Mechanical soil sampling sensors
  Dielectric soil sampling sensors
  Leaf sampling sensors
  Sap sampling sensors
  Soil moisture sensors (4) Environmental Sensors:
  Airflow sensors
  Thermometer
  Barometer
  Water pressure and flow sensors Kinematic Sensors are used to estimate the current location and kinematics of the robots, which can then be used to locate nearby objects.

Perception Sensors are used to detect objects and obstacles around the robot. This is combined with the location and kinematic estimations through the use of an Extended Kalman Filter (EKF) or Unscented Kalman Filter (UKF) to localize the robot to a high degree of accuracy. Perception Sensors are further used to gather data about the structure and location of objects relative to robots, which is combined with other data sources to map the global structure and location of these objects. The sensors collect point cloud data, which is meshed with camera data to obtain a colored point cloud. This information is used to construct metadata such as branch structure, the thickness of foliage, and the location of each fruit on each tree.

Fruit and Tree Health Sensors are used to gather visual information about the health and coloration of plants, fruit, and other objects within the orchard. Cameras may take images of the coloration of fruit and trees, which are used to make predictions about the fruit and tree health. Hyperspectral cameras and infrared cameras are used to gather important non-visible cues at various wavelengths and frequencies to gain accurate insight into the health of these same objects. NDVI sensors are used by drones to map the macro-scale health of the orchard from above.

Soil sampling sensors, leaf sampling sensors and sap sampling sensors are used to collect physical samples from specific trees within the orchard, as well as measuring the health, water levels and nutrient levels of soil from around the orchard.

Orchard Management Algorithm

The process of orchard management involves the distribution of input resources from a hub to a particular set of trees, and the collection of output resources from these trees back to a hub. Input resources can include empty bins, tools and end effectors, workers and supervisors, and fuel and charged fuel cells. Output resources can include fruit, nuts and filled bins, used tools and end effectors, branches, leaves, workers and supervisors, and empty fuel cells.

Figure 5:
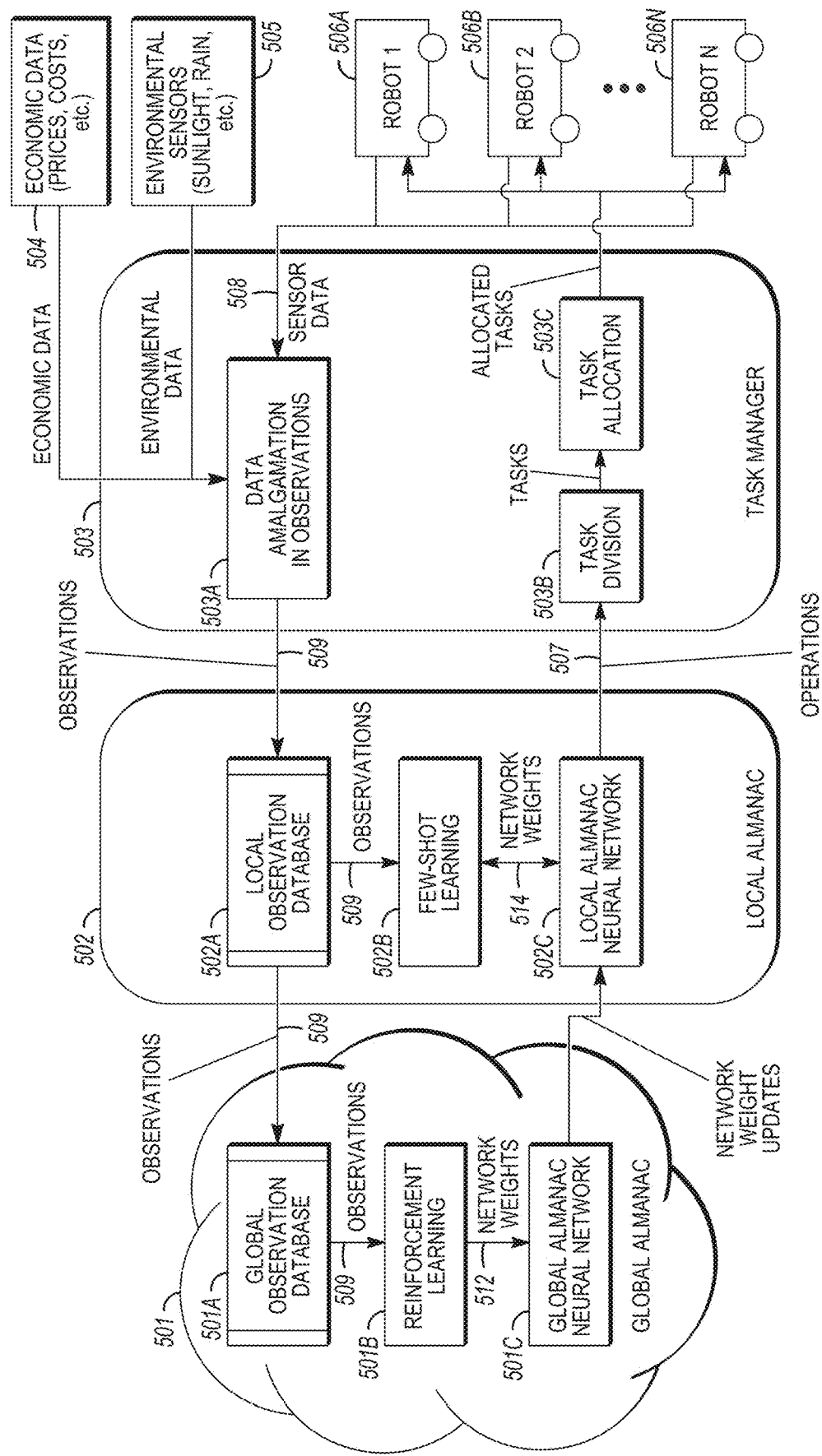
FIG. 5 illustrates a swarm algorithm for managing an orchard in accordance with one or more embodiments of the invention.

Autonomous robots may be considered the backbone of future orchard management. Autonomous robots allow for the transfer of resources between hubs and trees, and complete practices at trees. Mobile autonomous robots are able to store and retrieve resources at hubs and nodes, and can transfer resources directly to or from another robot. Therefore, embodiments of the invention may consider the problem as a series of resource transfers between hubs and trees, and the completion of operations, facilitated with autonomous mobile robots. FIG. 5 illustrates a swarm algorithm for managing an orchard in accordance with one or more embodiments of the invention.

Task Manager 503

At the core of the algorithm, a system referred to as the Task Manager 503 oversees large-scale jobs around an orchard. The Task Manager 503 is in charge of breaking down large-scale Operations 507, which it receives in queries to the Almanacs (i.e., global almanac 501 and local almanac 502), into single-robot Tasks, which is referred to as Task Division 503B. The Task Manager 503 then distributes those Tasks to individual robots 506 (robots 506A, 506B, . . . , 506N are referred collectively as robots 506) within a swarm, which is referred to as Task Allocation 503c.

The Task Manager 503 interface is also where system-level fleet management occurs. Operators can monitor their fleet, responding to errors and edge cases that crop up across an orchard and remotely respond to them.

Data Amalgamation

Figures 6A, 6B:
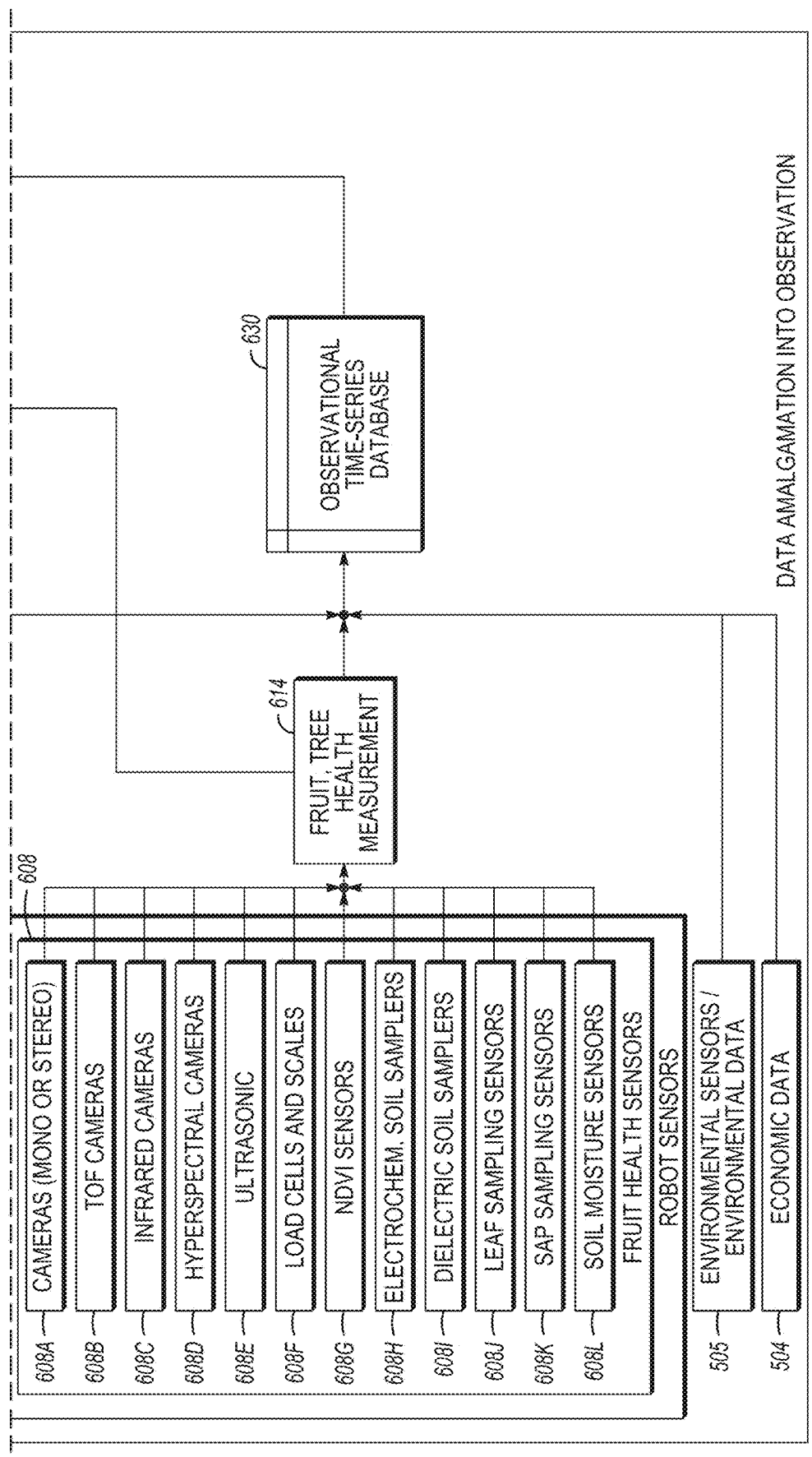
FIG. 6 illustrates the logical flow for data amalgamation in accordance with one or more embodiments of the invention.

FIG. 6 illustrates the logical flow for data amalgamation 503A in accordance with one or more embodiments of the invention. Referring to both FIGS. 5 and 6, as robots 506 complete tasks, they gather sensor data 508 about the current state of the orchard, including images of fruit, 3D models of tree shape, soil samples, and more (see discussion above re Sensors). Such sensor data may include data from different types of robot sensors 602 including kinematic sensors 604, perception sensors 606, and fruit health sensors 608. As described above, kinematic sensors 504 may include RTK/GNSS GPS sensor 602A, magnetometer 602B, encoders 602C, odometry sensor 602D, and IMU sensor 602E. Perception sensors 606 may include lidar sensor 606A, radar sensor 606B, ultrasonic sensor 606C, cameras (mono or stereo) 606D, ToF cameras 606E, infrared cameras 606F, and microphones 606G. Fruit health sensors 608 may include cameras (mono or stereo) 608A, ToF cameras 608B, infrared cameras 608C, hyperspectral cameras 608D, ultrasonic sensors 608E, load cells and scales 508F, NDVI sensors 608G, electrochemical soil samplers 608H, dielectric soil samplers 608I, leaf sampling sensors 608J, sap sampling sensors 608K, and soil moisture sensors 608L. Additional data may be include economic data 504, and environmental sensors/environmental data 505.

The Task Manager 503 consolidates this data 508. For example, the data from kinematic sensors 604 may be consolidated into kinematic measurement(s) 610, data from perception sensors 606 (combined with kinematic measurements 610) may be consolidated into 3D mapping and localization data 612, and the data from fruit health sensors 608 may be consolidated into fruit and tree health measurements 614. Such consolidated data 505, 505, 610, 612, and 614 may collectively be referred to as Observations 509. Such a process of consolidation and processing is referred to as "Amalgamation" 503A. Such amalgamation 503A is performed before uploading the observations 509 to the Almanacs 501-502, where the observations 509 are used to estimate the current state of the orchard, and is used as training data for a Few-Shot Reinforcement Learning Algorithm 502B. As such, the Task Manager 503 serves as the broker between the orchard-level Almanacs 501-502, and individual robots 506 within the orchard.

For low-to-ground data, wheeled robots 506 are given Tasks to drive through key points of the orchard, where observations are needed, recording this data 508 using the listed sensors. For above-the-canopy data, Tasks are allocated to drones/drone robots, which fly above these key points collecting data 508 using sensors. Each of these robots 506 also passively collects all sensor data 508 on unrelated missions, which is all synthesized into higher-level insights through the Amalgamation 503A process.

The information collected by each sensor 504-505, 602 is combined through the use of sensor fusion, and estimation techniques such as Extended Kalman Filters (EKF) and Unscented Kalman Filters (UKF). Together, this is combined into local 3D maps, which include 3D and color information about the surroundings of a robot 506. This information is stored in an observational time-series database that allows for offline testing and training of artificial intelligence (AI) models.

Machine learning techniques, as discussed in depth in the AI Almanac section below, are used to build AI models of the orchard that abstract away the low-level sensor data, providing an understanding of the current health, state and structure of an orchard. This brings in information from the local 3D maps, and nutrient data from nutrient sampling sensors and NDVI sensors. This includes object detection and classification 616 (i.e., including (i) object detection 618 such as tree detection 620 which leads to a classification of the tree heath and structure 622; and (ii) fruit detection 624 which is then used to classify the fruit health and ripeness 626). In this regard, "features" are extracted such as fruit, branches, trees, leaves, and more, that are represented as parameterized objects.

The confluence of local 3D maps, and these parameterized features, are periodically (e.g., once per day) used to build a 3D map of the orchard, referred to as a "snapshot" 628. In FIG. 6, these periodic snapshots 628 provide a global 3D orchard map. Further, these snapshots provide a complete 3D representation of the state of the orchard, and is tied (via data in the observational time-series database 630) to economic data 504 such as the cost of labor and price of fruit, and environmental data 505 such as levels of sunshine, rain, wind, etc. The storage of these periodic snapshots 628 allows for the tracking of the health and state of each part of an orchard over its entire history. Orchard managers can do things such as viewing a timelapse of the growth of their trees, or the harvesting of fruit, with each frame representing a single hour, day, week, or month of progress.

These snapshots 628, when paired with local 3D observational data 630, represent the modifications made by robots to this global 3D map, in real time, in order to assess the productivity of the system.

Orchard Operations

Whenever it completes an operation, the Task Manager 503 queries a local database for new operation requests. In the general case, these operations are generated by the Local Almanac 502, a set of neural networks 502C whose purpose is to direct the management of an orchard at the highest level. Alternatively, these operations can be generated by human operators, through a graphical user interface.

Some embodiments of operations may include:

(1) Plant trees using seeds, rootstalks, or transplants onto existing stumps. The basic use case is with a specified row width, and tree spacing (e.g., in a square pattern). Embodiments of the invention may also utilize a different geometric pattern that optimizes placement.

(2) Scan an orchard, assigning unique identifiers $\{t\_1, t\_2, t\_3 \ldots t\_n\}$ to every tree detected. Embodiments may assign a location and other physical parameters to each tree's attributes.

(3) Gather data about the set of trees $\{t\_1, t\_2, t\_3 \ldots t\_n\}$. This may include updating tree locations within an orchard and Orchard Block, and/or updating a 3D model of tree structure, including identifying key structural features such as: (i) leaders, spurs, fruitwood and water sprouts; (ii) trunk structure, crotch and sucker sprouts; (iii) primary scaffold limbs, secondary scaffold branches; and/or (iv) artificial support structure(s). Such embodiments may also update a 3D model of all fruit relative to tree structure, including key features such as: (i) fruit size and shape; and/or (ii) fruit color and ripeness.

(4) Gather nutritional information about the set of trees $\{t\_1, t\_2, t\_3 \ldots t\_n\}$. Examples of nutritional information include: (i) soil nutrition samples from the tree base; (ii) NDVI measurements from above the canopy; (iii) leaf samples; and/or (iv) sap samples.

(5) Water trees in the set of trees $\{t\_1, t\_2, t\_3 \ldots t\_n\}$. Embodiments may provider for individually tailoring the watering to the water needs of each tree.

(6) Apply fertilizer to the set of trees $\{t\_1, t\_2, t\_3 \ldots t\_n\}$. Fertilization may be individually tailored to the nutritional needs of each tree.

(7) Scaffold the set of trees $\{t\_1, t\_2, t\_3 \ldots t\_n\}$. Scaffolding may be based on an "optimal" tree structure for maximum yield and may include building the scaffolding and modifying the tree for an optimal structure.

(8) Prune the set of trees $\{t\_1, t\_2, t\_3 \ldots t\_n\}$. Pruning may be based on an "optimal" tree structure to maximize yield. Further, a series of pruning cuts may be specified per tree to move towards the optimal structure.

(9) Thin the set of trees $\{t\_1, t\_2, t\_3 \ldots t\_n\}$. Thinning may be based on an "optimal" fruit spacing to maximum the yield. A series of thinning cuts may be used to remove specified fruit, in order to prevent fruit overcrowding.

(10) Harvest the set of trees $\{t\_1, t\_2, t\_3 \ldots t\_n\}$. Harvesting may include harvesting all fruit that falls within specified ripeness criteria such as size, color and patterns, and/or softness.

The set of above operations may expand as orchard management technology improves.

Embodiments of the swarm algorithm may rely on human operations requests, generally controlled by the farm owner or manager. Alternatively, embodiments of the swarm algorithm may utilize a more complete Almanac dataset and understanding. Routine operations, such as daily orchard monitoring and fertilization, are launched autonomously by the Almanac. More complex operations, such as pruning, thinning, and harvesting, are launched by humans, but guided by insights from the Almanac. Farmers or farm managers can request operations and monitor the results through a web based graphical user interface.

A complex embodiment of the swarm algorithm may feature an extensive set of training data. In such an embodiment, the Global Almanac 501 has a complete understanding of the process of orchard management across orchards, and each orchard's Local Almanac 502 maintains a set of internal parameters specific to the orchard in question, which can be used to generate operations requests that will result in optimal yields. In such embodiments, the Local Almanac 502 is capable of complete autonomous management of orchards, at all levels.

AI Almanac

As the Task Manager 503 carries out operations, it monitors all nodes within the orchard. As discussed in 3D Mapping, the Task Manager 503 Amalgamates 503A sensor data 508 from robots 506 to monitor the health of all trees year-over-year, including key performance indicators such as tree structure, fruit yield, the history of operations on this tree, temperature, pressure, soil quality data, and much more.

This tree and robot-level data is paired with orchard-level data. This includes the decisions input by farmers, orchard management companies, and by the Local Almanac 502 itself. High-level data also includes economic factors 504 such as capital costs, labor costs, revenue earned per fruit, and the state of the fruit market, as well as environmental factors 505 such as sunlight cycles, rain cycles, etc. This set of data is referred to as "observations" 509, constructed in the Data Amalgamation 503A process.

The Task Manager 503 stores these observations to a "Local Almanac" 502. The Local Almanac 502 uploads the data to a central repository referred to as the "Global Almanac" 501 (i.e., into the Global Observation Database 501A), which contains all data collected by Local Almanacs 502 around the world. Reinforcement Learning 501B is applied at the Global Almanac 501 level to learn the historical trends for which orchard practices produce the best tree health, year-over-year yield output, and total market value, with minimal resource costs. Insight from farmers and traditional farmer's almanacs is used to guide this learning algorithm, especially in the early stages of training. Further, the Reinforcement Learning 501B may provide network weights to update the global almanac neural network 501C.

On a periodic basis, the Local Almanac 502 adapts a local model, using the global model, via few-shot learning 502B, based on the data stored (e.g., in local observation database 502A) about the local orchard. The result is a set of neural networks 502C that can predict the expected value produced by any practices within the orchard. Internal parameters for this few-shot learning algorithm 502B may include: (1) local climate data/history (e.g., temperature, sunlight, rain, and soil quality); (2) availability and cost of local picking, packing and shipping companies; (3) market cost of fuel, parts and labor in the area; (4) historical trends for fruit prices in the area; (5) current orchard configuration, including tree spacing, tree structure, and/or fruit varieties.

Embodiments of the Almanac 502 may also include: (1) a model of optimal tree structure, given local climate data and the current orchard configuration; (2) a model of tree nutritional and water requirements, given local climate data, the current orchard configuration, the current tree structure, and/or the current fruit levels; (3) a model of optimal fruit spacing, given local climate data and the current tree structure; (4) a model of optimal tree spacing, given local climate data and robot size and shape; (5) a system of heuristics based on traditional almanacs; and/or (6) a Q-learning network wherein inputs are the current state of the orchard, including environmental data, market data, and per-tree data, and outputs are the estimated value of each of discrete set of operations, as specified in Orchard Operations.

In view of the above, it may be seen that the few-shot learning algorithm 502B receives information from the local observation database 502A and/or the local almanac neural network 502C and applies network weights 514 to such data to update the local almanac neural network 502C. In addition, after tasks have been assigned and performed, the local observation database 502A is updated with local observations that can be passed back to the few-shot learning algorithm 502B, which again updates the neural network 502C (based on both the local observation database 502B and global almanac 501). Accordingly, the few-shot learning algorithm 502B provides for machine learning where the neural network 502C is automatically updated to produce a revised set of orchard operations in an autonomous manner.

Optimal Tree Structure

In orchard management, different branch types are commonly used to guide trees towards a balance between new growth and fruit growth. Prior art practices focus on using manual heuristics and human intuition to make pruning cuts, in order to balance this growth and maximize yield. Key tree structures may include:

Leaders, spurs, fruitwood and water sprouts;
Trunk structure, crotch and sucker sprouts;
Primary scaffold limbs, secondary scaffold branches; and
Artificial support structure.

The characteristics of these tree structures are well understood, and recognizable by modern convolutional-neural-network (CNN) based classification techniques. Embodiments of the invention train this CNN using supervised learning, by taking samples of colored point-cloud data as training data and labelling it with the correct branch classification. This point-cloud data is fed as an input to the network, and the branch classification as an output, and gradient descent is run on the network.

Embodiments of the invention further guide this classifier using heuristics, because the structure of a tree necessitates that certain limb types cannot branch off of other limb types. For example, the roots of a tree must precede all other parts of the tree structure, and only the trunk can follow. Leaders, leaves, and fruit must always be at the end of the tree structure, and secondary scaffolding must follow primary scaffolding. Using machine-learning based computer vision, combined with these heuristics, a classifier is trained to reconstruct a parameterized structural model of a tree, including the location and qualities of all fruit on the tree, given a set of colored images and point cloud data.

This structural model is a mathematical tree, with parameters on each branch of the mathematical tree describing the physical parameters of the physical tree. Here, "limb" is used to refer to all subcomponents of the tree, including roots, trunk, branches, fruit, leaves, and more. Some parameters may include:

Limb length
Limb thickness
Limb children
Limb xyz, roll-pitch-yaw offset from parent limb Given this structural classifier, embodiments of the invention train another artificial neural network to estimate the amount of yield that will be produced by the tree over a multi-year period, given environmental factors. This is done by taking structural samples (s) of many trees in many orchards, and pairing this with environmental data (e), as well as with records of quantity and quality fruit harvested from that particular tree in that season (f). For each set (s, e, f), gradient descent is run on this neural network to improve its estimate of harvest quality given these inputs.

The best structure for an orchard tree is largely dependent on the environmental conditions of the orchard. For example, in Washington, orchards receive a small amount of light, so flat and vertical trellises, or V-shaped trellises, are largely regarded to be the best tree structures for yield. In contrast, orchards in California receive more light than can be used in a single canopy layer, so thick branching structures are more able to capture all available light. Therefore, the yield predictor takes as inputs environmental factors such as light intensity and consistency, temperature, rain levels, and soil quality.

An important environmental parameter is the envelope in which the tree is allowed to grow. This envelope is derived from the tree spacing (and the envelopes of neighboring trees), as well as other parameters such as need for access by ladders, maximum ladder height, equipment size and shape.

With a model for the predicted yield of a tree given its structural model, and a structural model for each tree, embodiments of the invention compute what pruning changes that are the most likely to benefit future tree yields. A search algorithm iterates across tree structure, choosing the tree structure which results in the highest predicted multi-year yield. The difference between this tree structure and the current structure will be given as "prune" actions within a pruning operation.

Figure 7:
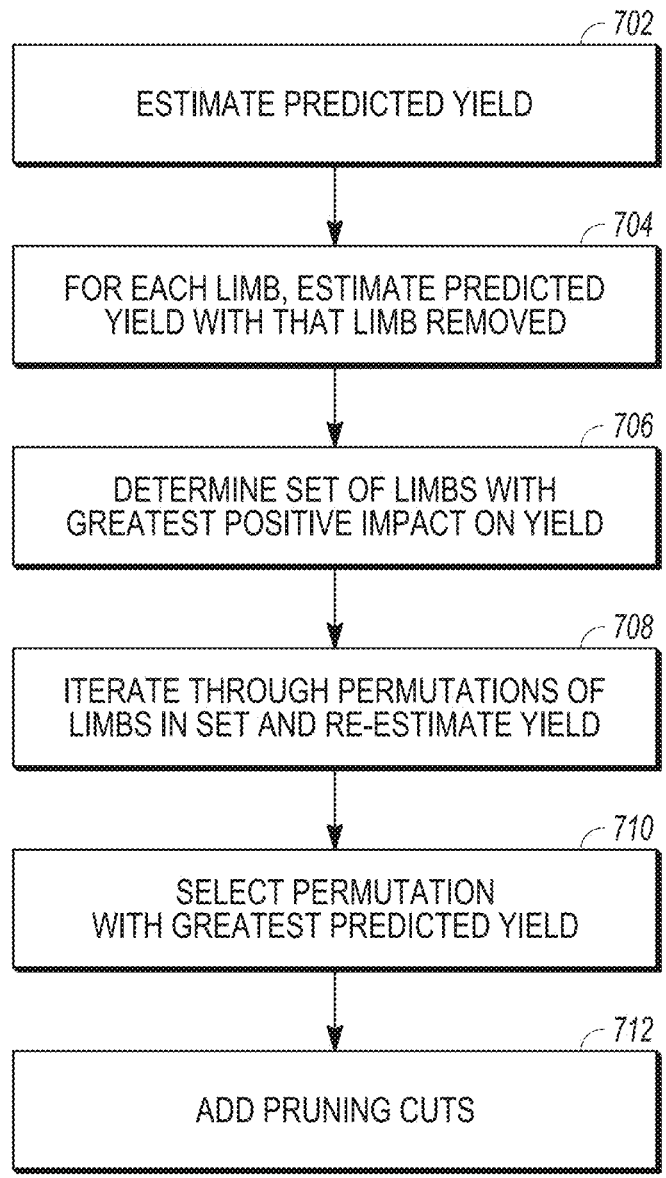
FIG. 7 illustrates a pruning algorithm for acquiring an optimal tree structure in accordance with one or more embodiments of the invention.

FIG. 7 illustrates a pruning algorithm for acquiring an optimal tree structure in accordance with one or more embodiments of the invention.

At step 702, the predicted yield is estimated given the current tree structure.

At step 704, for each limb on the tree (and its children), predicted yield is estimated if that limb is removed.

At step 706, the set of N limbs are determined and includes those limbs whose removal will have the greatest positive impact on yield.

At step 708, all permutations of these N limbs is the set are iterated, re-estimating yield.

At step 710, the permutation with the greatest predicted fruit yield is selected. This is the chosen set of limbs to remove in pruning.

At step 712, pruning cuts are added for any part of limbs extending outside of the tree's allowable envelope.

Tree Nutritional and Water Requirements

Based on the above actions, embodiments of the invention have an estimator for yield (given tree structure and environmental factors). In determining an Optimal Tree Structure, environmental factors were held constant to historical expectations, while iterating across tree structure and predicting resulting yield. In alternative embodiments, controllable environmental factors are iterated across, such as watering, fertilization, spraying of pesticides, and more, while holding tree structure constant. These factors are sequential and timing-dependent. Therefore, embodiments include including a discretized history of these factors in the input layer of the estimator, or using LSTM (long short-term memory) neurons within the estimator to keep track of history.

Due to random events such as rain, water runoff and clouds, the state of the system will often stray from the predicted state. Therefore, when deciding on the optimal action to take at the current time, embodiments of the invention take into account a few computer-generated, statistically modeled pseudo-random future events, such as significant and very little sunlight, very little rain and significant sunlight, etc. The best watering/fertilization plan is the plan that maintains the highest expected yield across the sum probability of these events occurring. This can be calculated by iterating through these events, estimating their probability based on historical data, and multiplying their expected yield by the likelihood of that event. The sum of all of these computations is the overall expected yield given a particular watering/nutritional operation.

There are good manual heuristics in place for tree watering and nutrient management. In one embodiment of optimal nutrient management, these heuristics are added to a cache of potential nutrition plans. By adding random noise to the solutions in the cache, hypotheses for new nutrient plans may be tested against the estimator's understanding of the system. Well-performing hypotheses are added to the cache, and the best-performing hypotheses are tested in the real orchard. Then, real feedback about the results is received, which accounts for actual external environmental events, and can be used to update the yield estimator based on this new data.

Optimal Fruit Spacing

While fruit quantity is generally good, overabundance of fruit can be problematic for a few reasons. If fruit grows to the point where multiple fruits are touching, this can cause bruising, offer an entry point for disease, and prevent the fruit from reaching full size. It is usually preferable to sell a smaller quantity of larger, healthier fruit than it is to sell a larger quantity of smaller, less healthy fruit. Another issue is that a tree may overbear in a particular year, and then not bear any fruit in the next year, which is known as biennial bearing. A third issue is that for some fruit varieties, branches may actually snap under the weight of too many fruits.

As a result, thinning seeks to keep fruit below certain thresholds, and spaced far enough apart to prevent fruit from touching. This is currently done using heuristics about fruit spacing, as well as human intuition. But the application of modeling allows for automatic optimal fruit spacing.

Embodiments of the invention start by applying a predictor for how much fruit will result in biennial bearing. This is relatively simple to implement. An embodiment of this is the application of a statistical model for the likelihood of biennial bearing given the amount of fruit on the tree, and the tree's structural model. Then, thinning is carried out until this likelihood falls below acceptable criteria, and satisfies the other fruit spacing requirements.

A predictor is applied for fruit growth, including size, shape, and weight of a particular fruit. Based on the peculiarities of each fruit in the tree including fruit positioning, number of neighbors, visual health indicators, and environmental factors, the future growth of fruit can be estimated. In one embodiment, a neural network is applied to estimate fruit growth based on observations about the fruit's current state (e.g., the global almanac neural network 510C and/or the local almanac neural network 502C). The estimator may be trained by recording the life of each fruit from budding to harvest. Earlier data in the fruit's life is fed into the estimator's input layer, and the final resulting fruit is compared to the predicted results, allowing the estimator to be trained with gradient descent.

Next, a predictor for the likelihood of a branch snapping is applied (given the state of fruit on the branch). Using a fruit growth predictor, the total forces (including forces from child branches) applied by all fruit on the branch may be estimated. A structural model may be generated for each limb, so that the structural integrity of each limb can be estimated using mechanical dynamics calculations, including perturbations such as wind and human interaction, similar to when modeling the strength of a bridge. In one embodiment, this process includes the techniques used in the field of Finite Element Analysis (FEA). Then, the thinning process is run until structural integrity is well within an acceptable threshold.

Next, embodiments may verify that fruit will not touch. Based on the current position of each fruit on each branch, and an estimate for the future growth of each fruit, the future likelihood of collision between each pair of nearby fruit can be predicted. In one embodiment, a radial buffer is added on top of this predicted growth (to make sure that no two fruits are touching each other, with room to spare).

Finally, embodiments predict all of the potential shortcomings of fruit configurations. In an embodiment similar to that of Optimal Tree Structure described above, embodiments of the invention can iterate through different combinations of fruit removal, to find the optimal pattern. One can start with the furthest-out branches of the tree, iterating through the removal of fruit while satisfying all criteria outlined above, and find the solution that satisfies all conditions but maintains the highest total volume of fruit, or matches other market needs. Once all leaf branches are completed, embodiments iterate to the next branch level, until the trunk of the tree is reached. The result is the identification of the optimal thinning pattern to use for this particular tree.

Optimal Tree Spacing

Orchards often see vastly different levels of tree spacing, though in industries such as the apple industry, tree spacing is trending towards being as tight as will be allowed by modern tractors and other equipment. Tree spacing is a constrained optimization problem, with the following constraints:

Size and shape of operating equipment
Dexterity and accessibility of workers and robots for harvest and other operations
Vigor of tree growth and fruit production
Structural integrity at maximum fruit production
Maximum sunlight capture Manual and machine-based orchard management practices have meant that the only tree configuration used in orchards is a rectangular grid consisting of "rows" allowing the travel of equipment. But advances in the dexterity of orchard management machinery, including the advance of robotics, relax the current constraints, meaning that tree spacing can move towards the sort of tree spacing seen in forests, while still maintaining clear paths for equipment to pass through.

It is desirable for an orchard to maintain a simple tiled structure, for ease of navigation and uniformity in management. To deduce optimal tree spacing, the first step is to select a tile structure with a few geometric parameters. For a rectangular tile structure, parameters are row width and in-row tree spacing. The rectangular structure is not optimal because trees cannot be equally spaced, meaning that the tree needs to be shaped in a rectangular manner in order to fill all available sunlight space. This in turn puts extra constraints on the optimization problem, moving away from the optimal solution.

In one or more embodiments, an optimal orchard design may consist of a tiled hexagonal shape. This closely resembles tree spacing seen in natural tree growth, while still providing a structured layout for the passage of robots. This shape commonly emerges in nature because it is the best shape to fill a plane with equal size units, leaving the smallest amount of wasted space. Beyond this, it allows for equal travel in 3 directions, vs the primary travel in 1 direction currently seen for rectangular orchards, with less viable travel along a secondary direction.

Embodiments of the invention also include different geometric structures that may be more optimal and can be applied to orchard growth, which can be used in this constrained optimization problem.

Embodiments of the invention model the Optimal Tree Structure given environmental parameters, including tree spacing. Further, embodiments of the invention include a model to track the growth of fruit. Given these two models, optimal tree structure may be assumed (given the tree envelope corresponding to a set of tree spacing parameters). Maximal fruit growth may also be assumed within the constraints of the optimal fruit spacing model. Thereafter, by varying all tree spacing parameters in each dimension, embodiments of the invention predict the amount of fruit produced per tree, finding the optimal tree spacing.

Heuristic-Based Almanac

Deciding on which orchard-level operation to pursue is a core component of the AI Almanac. This process is one of the core purposes of the almanac and requires an understanding of all of the aforementioned criteria for success.

The industry standard for making decisions around orchard operations is the use of a set of heuristics. These heuristics are often specific or tailored to each fruit type, and are commonly available in traditional almanacs.

A simple embodiment of orchard operation scheduling is similarly based around heuristics. A series of criteria, based on traditional almanacs, determine which operation is the most appropriate, given the state of the orchard, and the state of the environment. These heuristics differ based on the fruit in question, and based on the environment where the fruit is growing. Some example heuristics include:

For peach trees, "Split fertilization applications by making the first application starting between bloom and petal fall in March, two months later in May, and at postharvest if any fruit is harvested. Do not apply fertilizer later than August 15$^{th}$."

For citrus trees, "Regular pruning for desert-grown citrus trees should take place in the spring, between February and April. Citrus-growing areas of the state which are cooler should delay the beginning of pruning until late-February or March."

For apples, "Thin before each apple reaches the size of a dime in diameter. This usually occurs within the first 20 days after petal fall."

These heuristics are made much more robust by integrating the above estimators for the future state of the system given potential operations. Beyond this, these heuristics are parameterized, such that these conditions are triggered when certain parameters are met (e.g., fertilization months, environmental conditions, fruit size, fruit color, etc.). With a parameterized system, a reinforcement learning or genetic algorithm makes small perturbations to these parameters, and observes the effect on the yield and quality of harvest over time, allowing for long-term system improvements.

Reinforcement Learning Algorithm

A more advanced embodiment of the operation management algorithm is a reinforcement learning algorithm. At a given time, the current state of the system is fed into the network, and the operation with the highest expected profitability is selected. Noise is injected into the operation selection in order to encourage exploration, and to avoid local minima.

Imitation learning helps to bootstrap the initial algorithm, by adding training data based on decisions from the "Heuristic-Based Almanac". Decisions are made through a hybrid of the two algorithms, with preference shifting towards the Artificial Neural Network (ANN) as its dataset expands and accuracy improves. Because the history of operations is important here, an internal-memory network, for example with LSTM neurons, or a history input, is appropriate.

Training is run at the end of a growth-harvest season. At this point, the sum of costs incurred and value produced is understood, and back propagated to all actions taken. Gradient descent is run to improve the ANN's ability to produce value through its actions.

The inputs of the ANN include state data about each tree within the orchard, environmental data, and market data. The output of the ANN is the action with the best expected value at the current time step.

In one embodiment, this can be implemented as a Q-learning network. This is a good application of Q-learning because there is a discretized set of possible actions (operations) to take, where the objective function is expected profit at harvest time, including revenue from harvest, and costs incurred throughout the growth-harvest season.

Task Division 503B

Figure 8A:
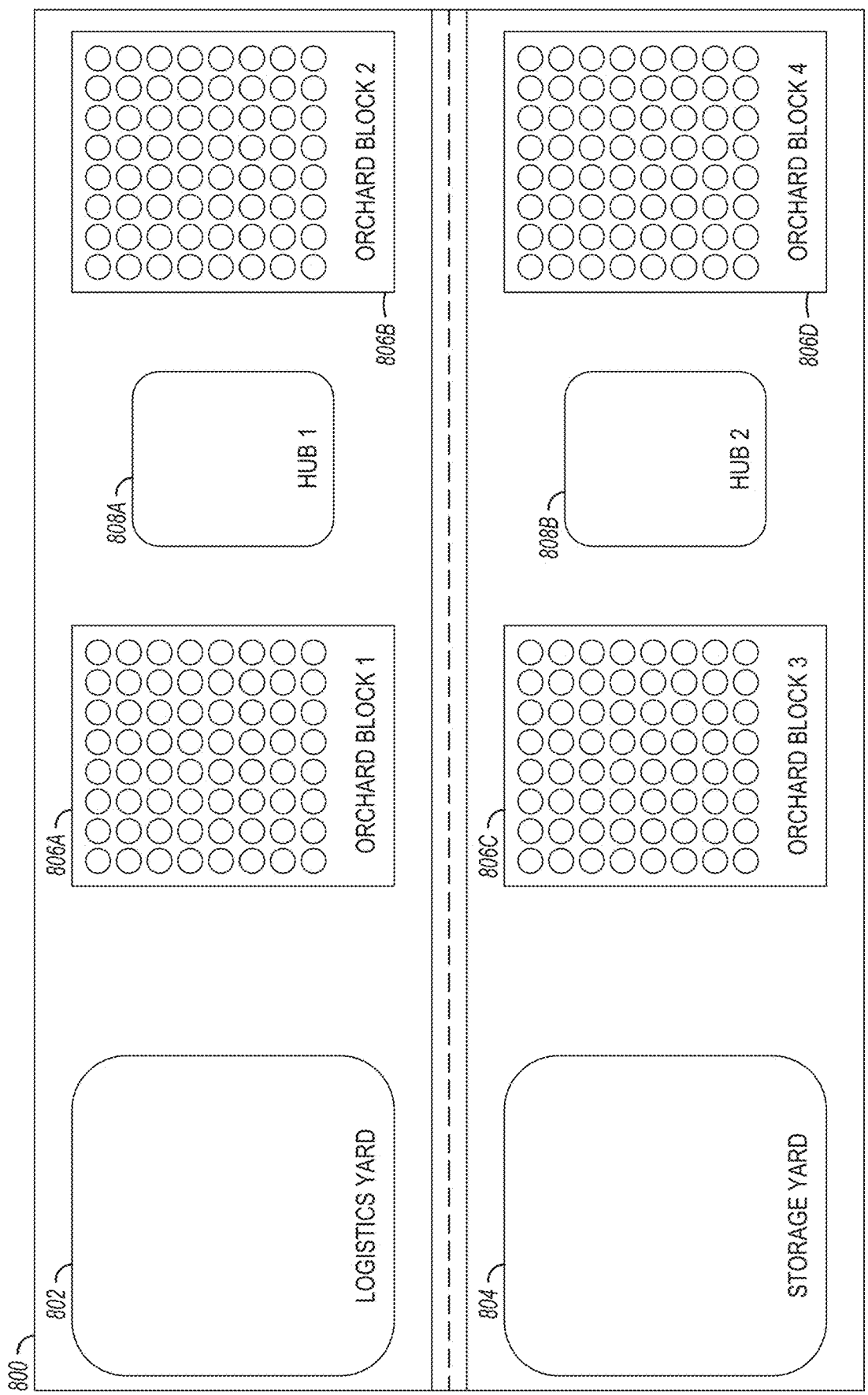
FIGS. 8A-8P illustrate exemplary sandboxes that reflect various exemplary stages of an orchard in accordance with one or more embodiments of the invention.
Figure 8P:
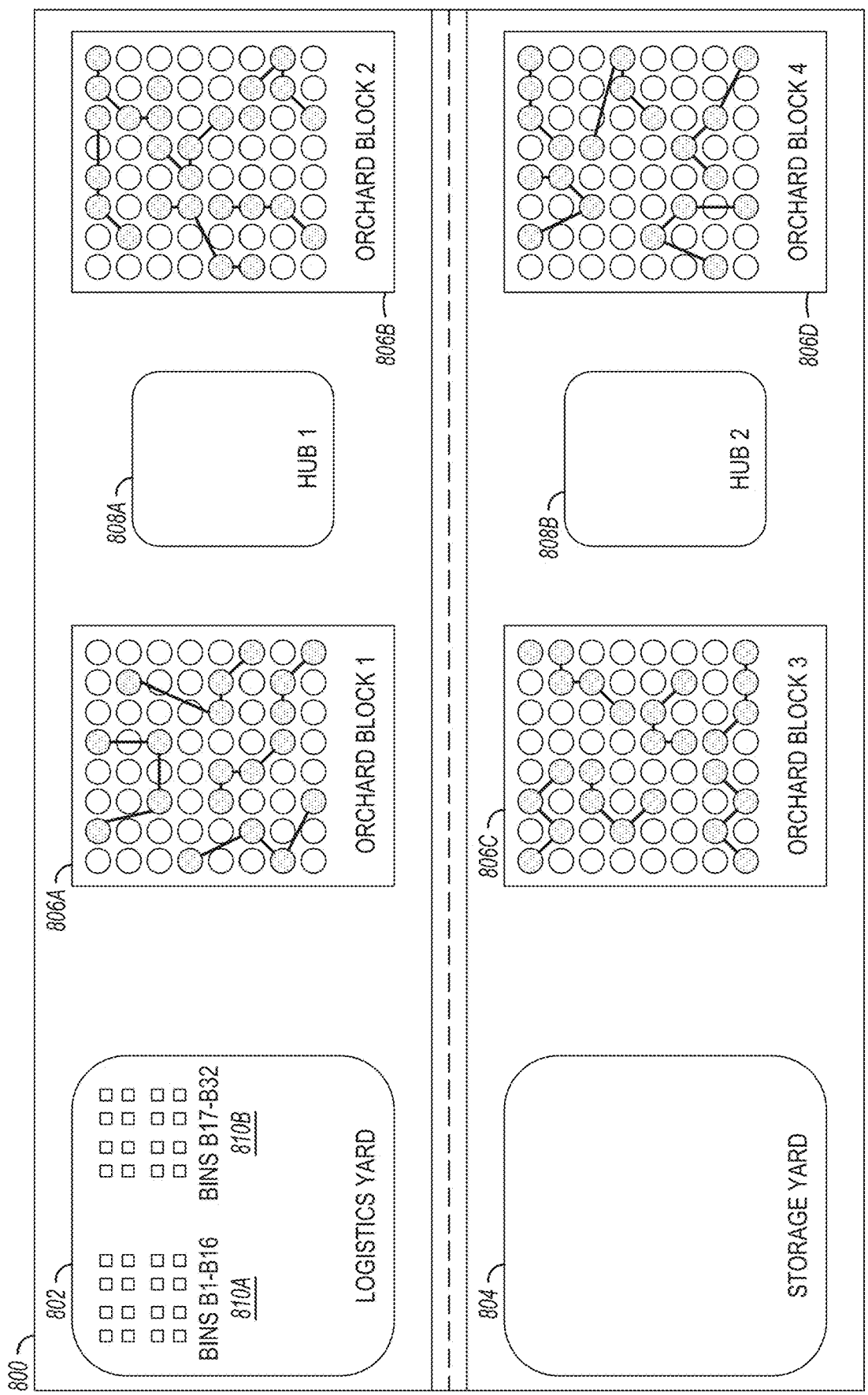
Figure 9:
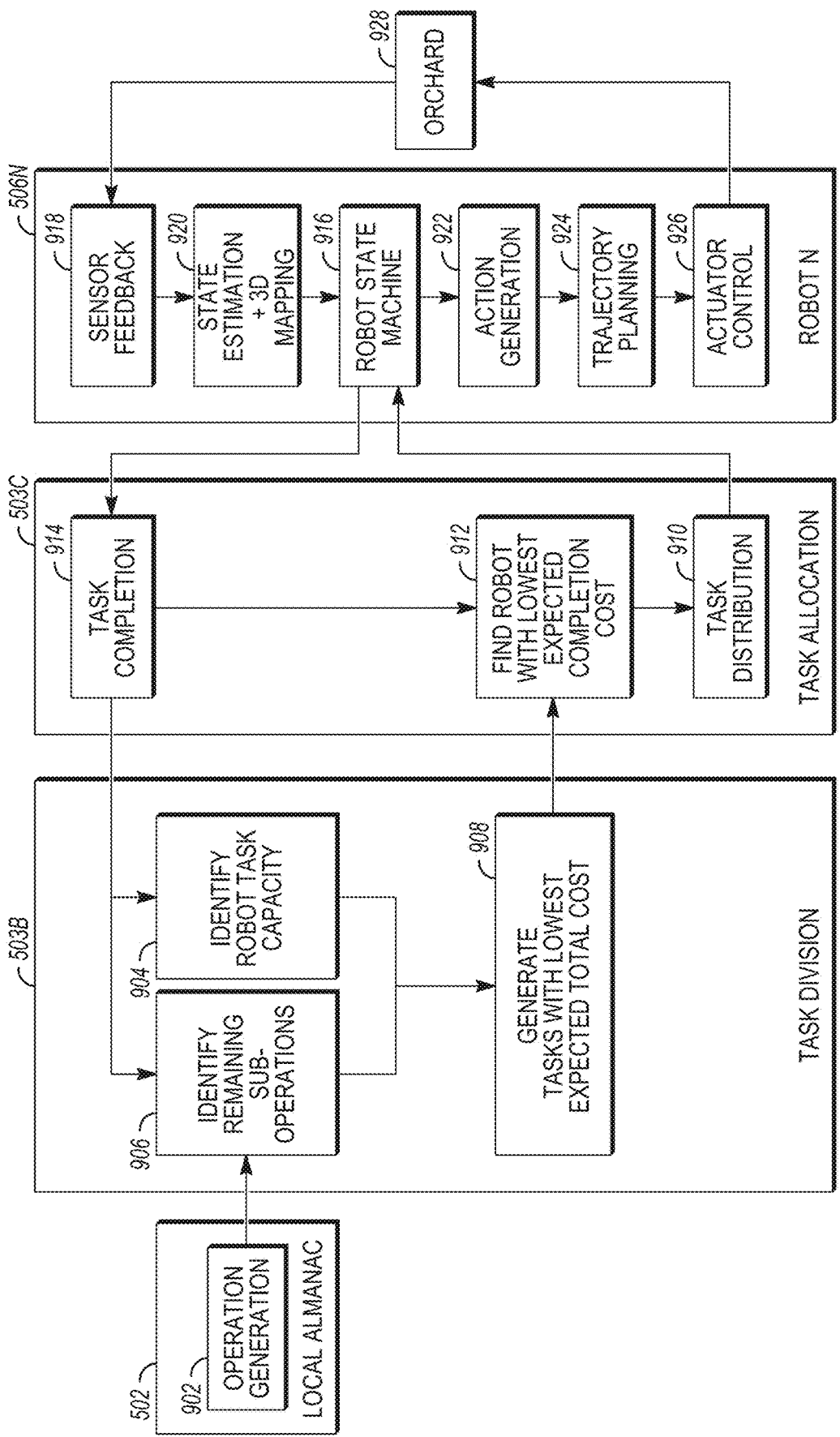
FIG. 9 illustrates the flow and further details for Task Division and Task Allocation in accordance with one or more embodiments of the invention.

Task Division 503B may be better understood by referencing exemplary sandboxes that reflect various exemplary stages of an orchard. Such exemplary sandboxes are illustrated in FIGS. 8A-8P. Further, while referencing FIGS. 8A-8P, FIG. 9 illustrates the flow and further details for Task Division 503B and Task Allocation 503C in accordance with one or more embodiments of the invention.

As described above, the Local Almanac 502 is used to generate operations 902 that are assigned to the Task Manager 503.

Once the Task Manager 503 is assigned an Operation, it needs to break this Operation into a series of Tasks, which when carried out together, will result in the completion of the Operation. Task Division 503B is separated from Task Allocation 503C, such that optimal Task Division 503B can be completed using abstract algorithms that do not yet involve robots, as opposed to expensive path planning computations.

Tasks are parameterized in terms of the resources that are transferred by and used in a particular Task. For example, a harvest operation consists of a series of Tasks to transfer empty bins from a Logistics Yard out to hubs, Tasks to take these bins from a hub and use them to harvest a set of trees before bringing them back to a hub, and Tasks to retrieve full bins and bring them back to a Logistics Yard.

The inputs to Task Division 503B may include: (1) current task capacity 904 (as reported/identified by fleet); (2) current operation 906, including completed vs remaining objectives (e.g., identified remaining sub-operations); and (3) current state of the orchard, including availability of resources.

The outputs 908 from task division 503B consist of a set of new Tasks to complete, not yet assigned to a particular robot. Such new tasks may include: (1) the cost or priority of teach Task (e.g., the tasks with the lowest expected total costs); and/or (2) state variables relevant to the Task, including the location and state of relevant resources. In pseudo-code, Task Division 503B may provide:

```
function divide_tasks(task_capacity, local_orchard, operation):
    new_tasks = [ ]
    while len(tasks) < task_capacity and not operation.is_done( ):
        remaining_ops = operation.get_remaining_ops( )
        available_resources = local_orchard.get_available_resources( )
        new_task = generate_next_task(local_orchard, remaining_ops,
available_resources)
        new_tasks.append(new_task)
    return new_tasks
```

For Task generation, there are a few embodiments, which vary in complexity and optimality. Embodiments may include Heuristic-Based Division, Search-Based Optimal Division, Local Search/Global Heuristic Division, Optimization based routing and resource allocation, Genetic Task Division, and/or Actor-Critic Task Division.

Referring now to FIG. 8A, FIG. 8 illustrates a base orchard sandbox 800 with a Logistics Yard 802, a Storage Yard 804, Orchard Blocks 1-4 806A-806D (collectively referred to as Orchard Blocks 806), and Hubs 1-2 808A and 808B (collectively referred to as hubs 808).

Cost Estimation and Orchard Management

The goal of Task Division 503B is to complete a specified orchard operation with minimum total cost. This problem is closely related to the well-studied Multiple Travelling Salesman Problem, an NP-hard problem. One seeks to find a series of Tasks, where a Task consists of moving between multiple points in an orchard, that minimizes the total expected cost of the operation. This total expected cost is denoted as follows: $C(O)=\Sigma_{i=1}^{n} E(C(T_i))$ where $C(O)$ is the cost of the operation, and $E(C(T_i))$ is the expected cost of Task i. The cost of a tasks can be calculated from or used to calculate the task's priority, and task priority can be used in place of task cost. In order to predict task cost, the simplest approach is to plan out the Task from the starting position of the nearest robot. But this is very time-complex, as each attempted sequence of Tasks requires the re-planning of these tasks. Instead, a cache stored in the AI Almanac estimates the cost of completing this Task based on the completion cost of similar Tasks. Similarly, past Task Division 503B can also be queried for similar operations, so that near-optimal solutions are found and adapted in order to minimize planning time.

Given an estimate for Task completion, it is often advantageous to eliminate certain Tasks from the current operation, especially if their cost is expected to exceed the value produced by those Tasks. An example of this is when a certain clump of trees in the far corner of the orchard is included in a harvest operation, but these trees are bearing only a small amount of fruit. When the expected cost of harvesting this fruit exceeds the predicted value associated with that fruit, a farm manager using the Orchard Management user interface has the authority to cancel those sub-operations. This can also be done autonomously through the use of the Almanac.

Heuristics-Based Row Division

The simplest way to divide tasks is with heuristics. In the simplest embodiment of this, a 2D orchard is divided into rows, with bins allocated to harvest a particular row until that bin is full, or paired to a set of trees in that row whose fruit quantity matches the fruit capacity of the bin. Bins are then paired to the nearest hub 808 to this Orchard Block 806, with Tasks generated to transfer bins from Logistics Yards 802 to this Hub 808, and vice versa. This can be instantiated with a preference for closely-clustered rows, in order to maximize robot collaboration, or far-spread rows, in order to minimize interference between the plans of robots.

Figure 8B:
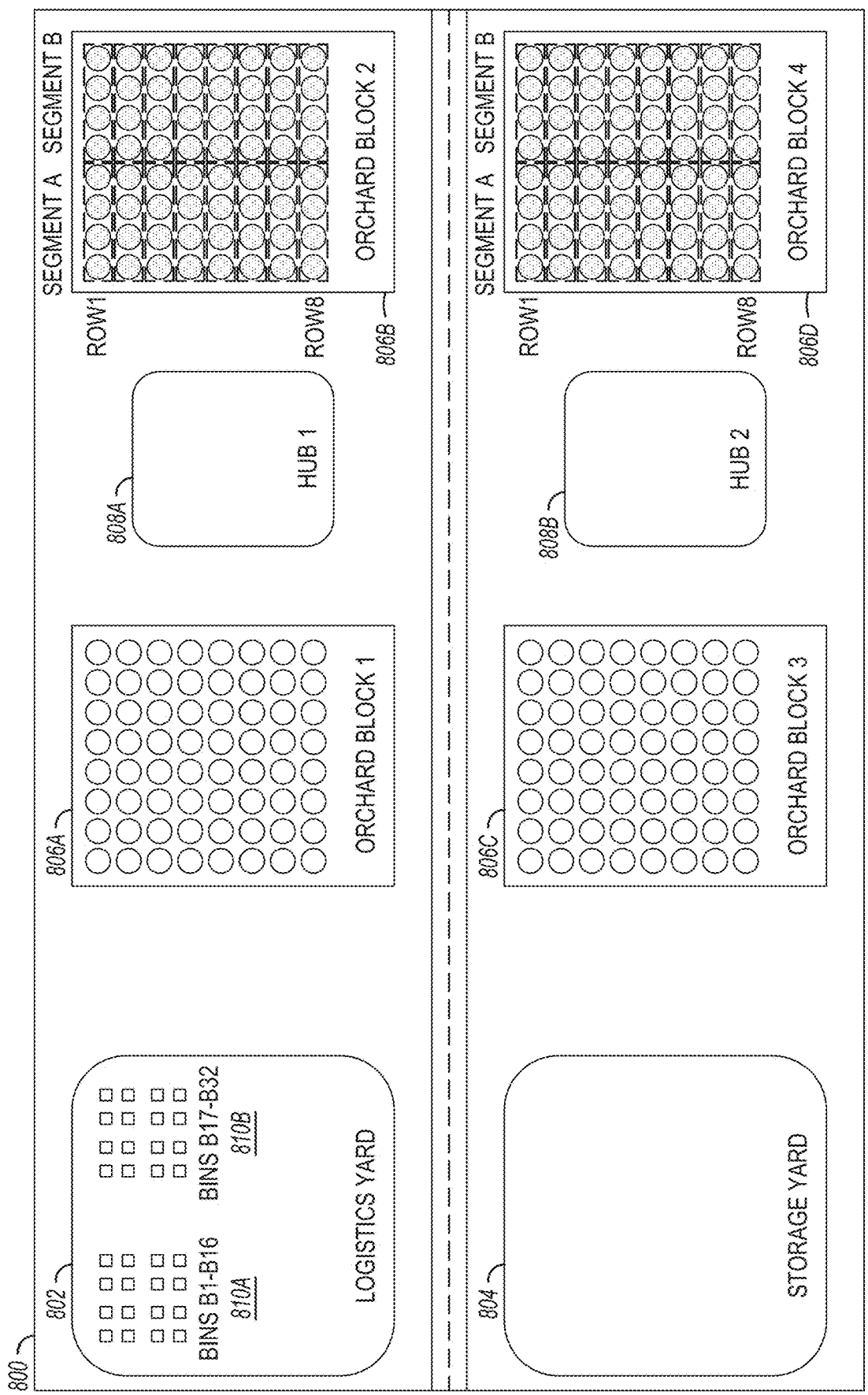

FIG. 8B shows an example case, using the orchard sandbox 800, with an Operation to harvest Orchard Blocks 2 806B and 4 806D. As shown in FIG. 8B, this heuristics-based approach works by dividing each Orchard Block 806 into rows, and then splitting each row into harvest segments, based on the capacity of each bin, and the amount of fruit on each tree. Bins B1-B16 810A are allocated to Hub 1 808A, and to Orchard block 2 806B. Bins 810 (i.e., bins 810A and 810B are collective referred to as bins 810) are allocated incrementally to Rows 1-8, segments A and B, respectively. Bins B17-B32 810B are allocated to Hub 2 808B, and to Orchard block 4 806D. Bins 810 are allocated incrementally to Rows 1-8, segments A and B, respectively.

Then, Tasks are generated to transport each bin 810 to their allocated hub 808, one for each bin 810. For Bins B1-B16 810A, the Task is formulated as:

$$T_1^{n=[1,16]}=\text{Transport}(B_n,\text{LogisticsYard}\to Hub1)$$

For bins B17-B32 810B:

$$T_1^{n=[17,32]}=\text{Transport}(B_n,\text{LogisticsYard}\to Hub2)$$

Next, tasks are generated to harvest using these bins 810, retrieving them from their respective hubs 808, and replacing them in their respective hubs 808. K represents the bin's fruit capacity in trees.

$$T_2^{n=[1,16]}=\text{Harvest}(B_n,Hub1\to Block2\to Hub1,\text{Tree}[n, n+K])$$

$$T_2^{n=[17,32]}=\text{Harvest}(B_n,Hub2\to Block4\to Hub1,\text{Tree}[n, n+K])$$

Finally, tasks are added to transfer the bins 810 back to the Logistics Yard 802:

$$T_3^{n=[1,16]}=\text{Transport}(B_n,Hub1\to \text{LogisticsYard})$$

$$T_3^{n=[17,32]}=\text{Transport}(B_n,Hub2\to \text{LogisticsYard})$$

The example used here and shown in FIG. 8B is the simplistic case, where fruit is evenly distributed amongst the trees. In reality, wide variation in the amount of fruit per tree may occur. Rather than using even row segments as illustrated in FIG. 8B, row segments may continue along a row until the accumulation of fruit is enough to fill a bin 810. Because estimated fruit quantity may differ from the real value, a Harvest Robot may leave one row segment and enter the next in order to get a full bin 810, or may not fully complete a particular row segment. As a result, it may be preferential to allocate only 1 row segment per row at a given time, so that the system is able to best adapt to these variations in real time.

Heuristics-Based Bin Buffer Division

Another embodiment is to set a buffer size of bins 810 per hub 808, near Orchard Blocks 806 being actively harvested. If the Task Manager 503 allocates tasks in order to maintain this buffer size, then harvesting robots will never run out of bins 810, or if there are not enough transfer robots to keep up with harvesting speed, some Harvest Robots will naturally switch to taking on transfer tasks when the buffer size gets too low. The buffer size may be a fixed value, or it may be calculated based on the amount of fruit available for harvest within an Orchard Block.

Figure 8C:
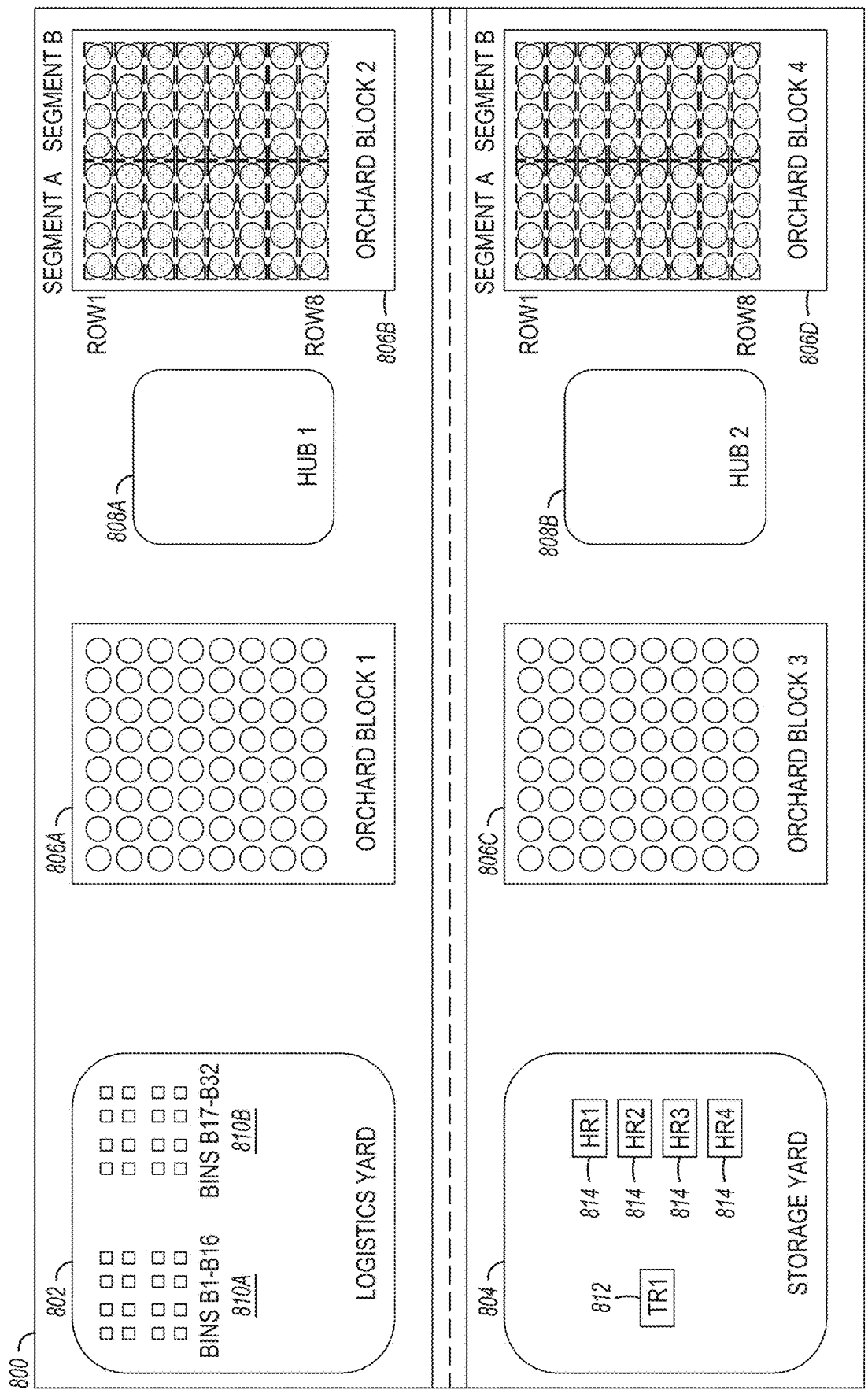

In another example illustrated in FIG. 8C (i.e., of a heuristic based bin buffer division), Orchard Blocks 2 806B and 4 806D are being harvested. In this example, 1 Transport Robot and 4 Harvest Robots will be used (2 per Orchard Block 806). In this example, the bin buffer parameter is set to be 4 bins 810 per hub. The same row-division strategy is used for harvest. The Transport Robot 812 is labelled as TR1, the Harvest Robots 814 are labelled as HR1-HR4.

Figure 8D:
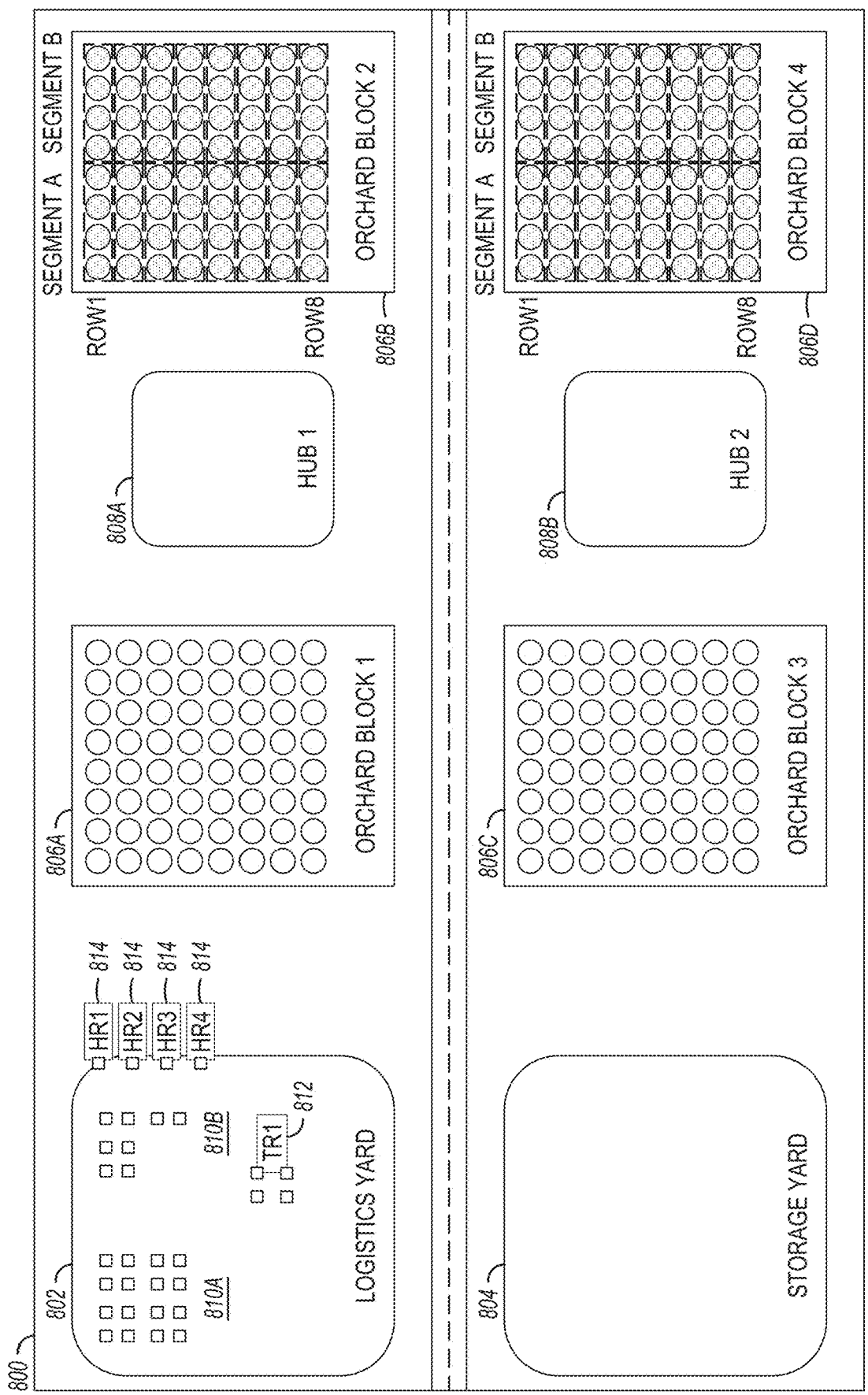
Figure 8E:
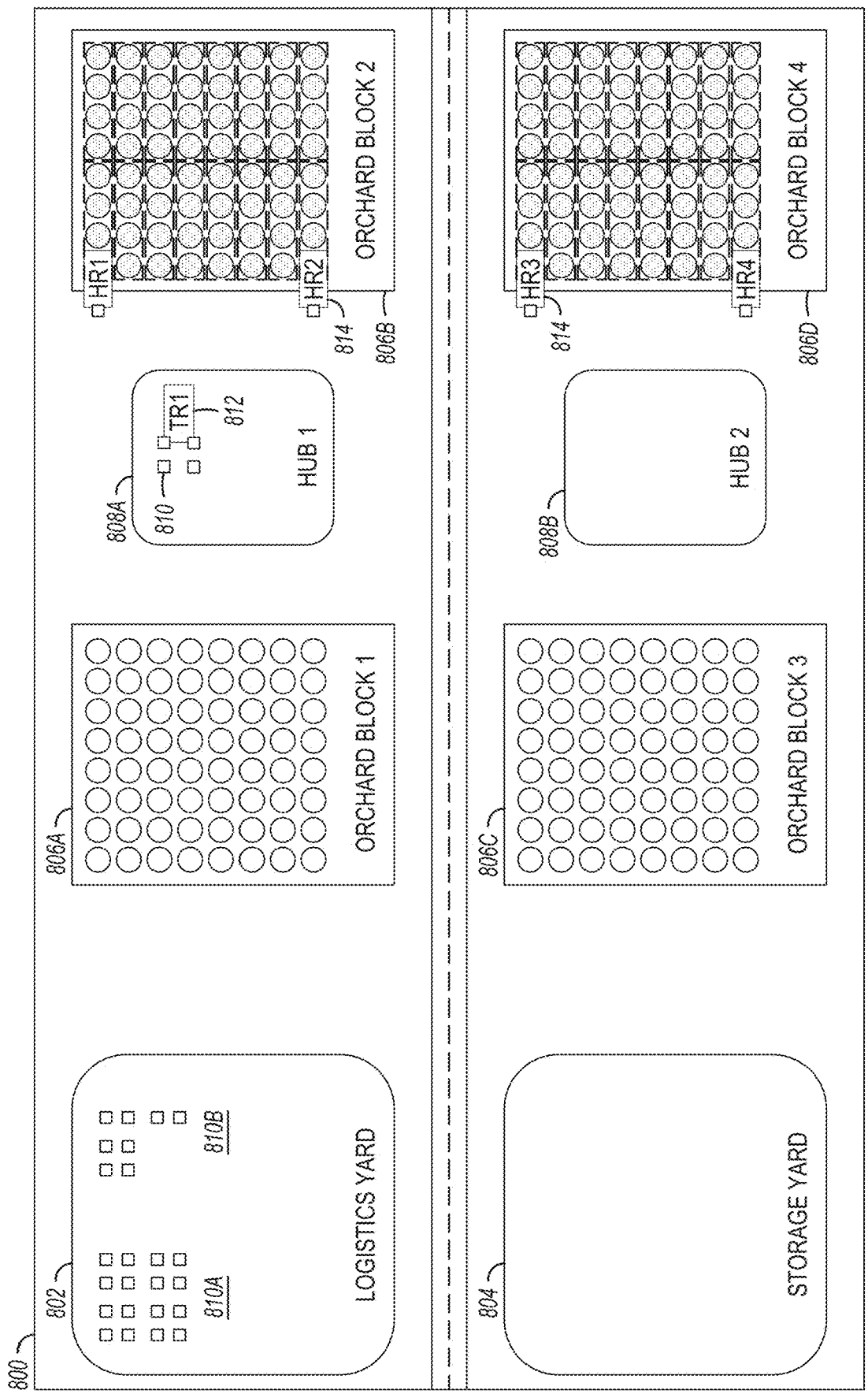
Figure 8F:
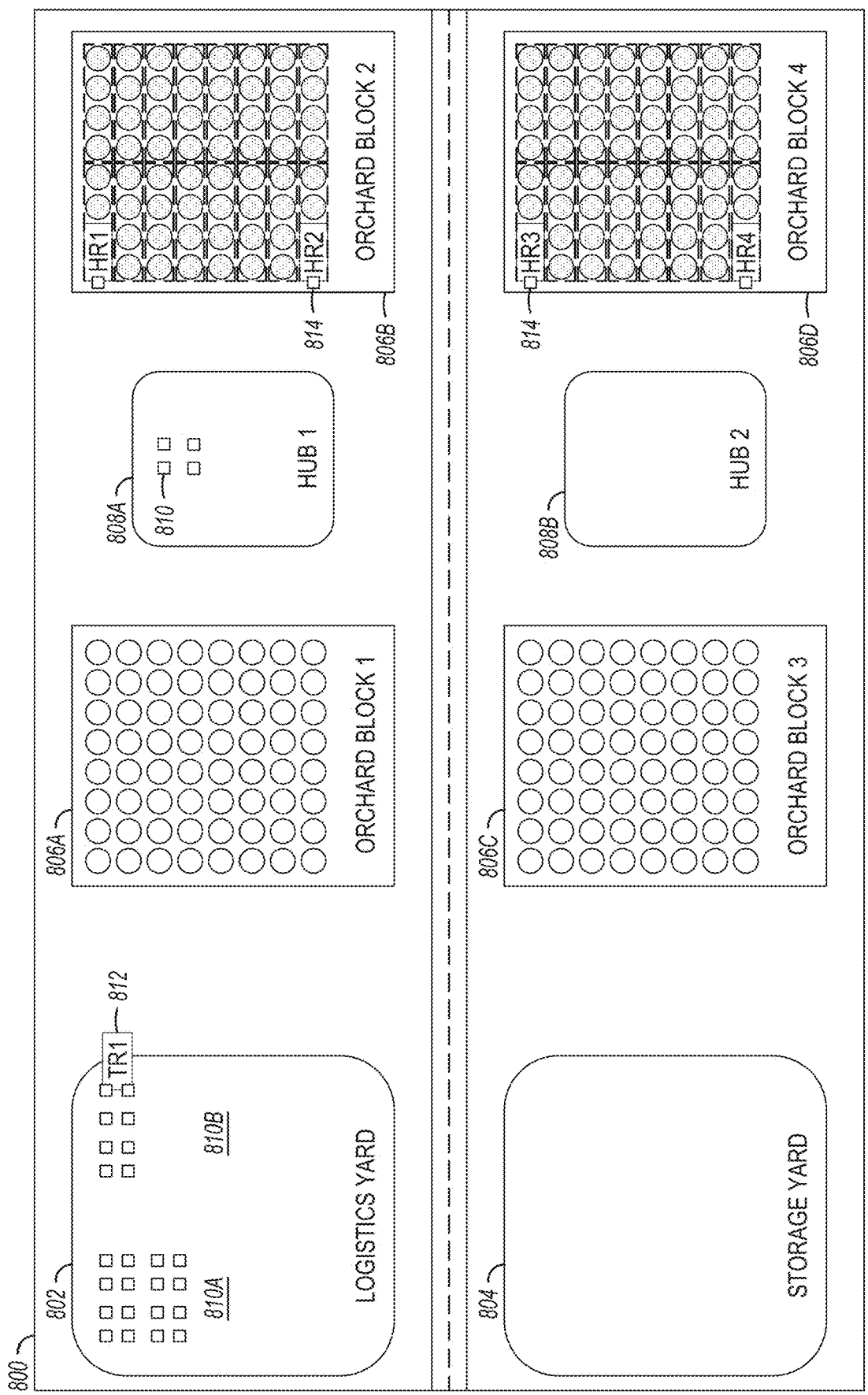

At first, there are no bins 810 available in either Hub 808. A transport task is allocated to deliver 4 bins 810 to Hub 1 808A, and 4 to Hub 2 808B. This task is allocated to the Transport Robot 812. Because there are no bins 810 available at the Hubs 808, Harvest Tasks are generated using bins 810 from the Logistics Yard 802, and returning the bins to Hub 1 808A. The Harvest Robots 814 are allocated these tasks. In this regard, FIG. 8D illustrates Harvest Robots 814 retrieving bins. In FIG. 8E, as the Harvest Robots 814 begin their harvest segments, the Transport Robot 812 delivers the bins 810 to Hub 1 808A. Thereafter, the Harvest Robots 814 begin harvesting and the Transport Robots 812 fill the Hub 2 808B buffer. As illustrated in FIG. 8F, the Transport Robot 812 returns to the Logistics Yard 802 to retrieve more bins 810 to deliver. Meanwhile, the Harvest Robots 814 continue their segments.

Figure 8G:
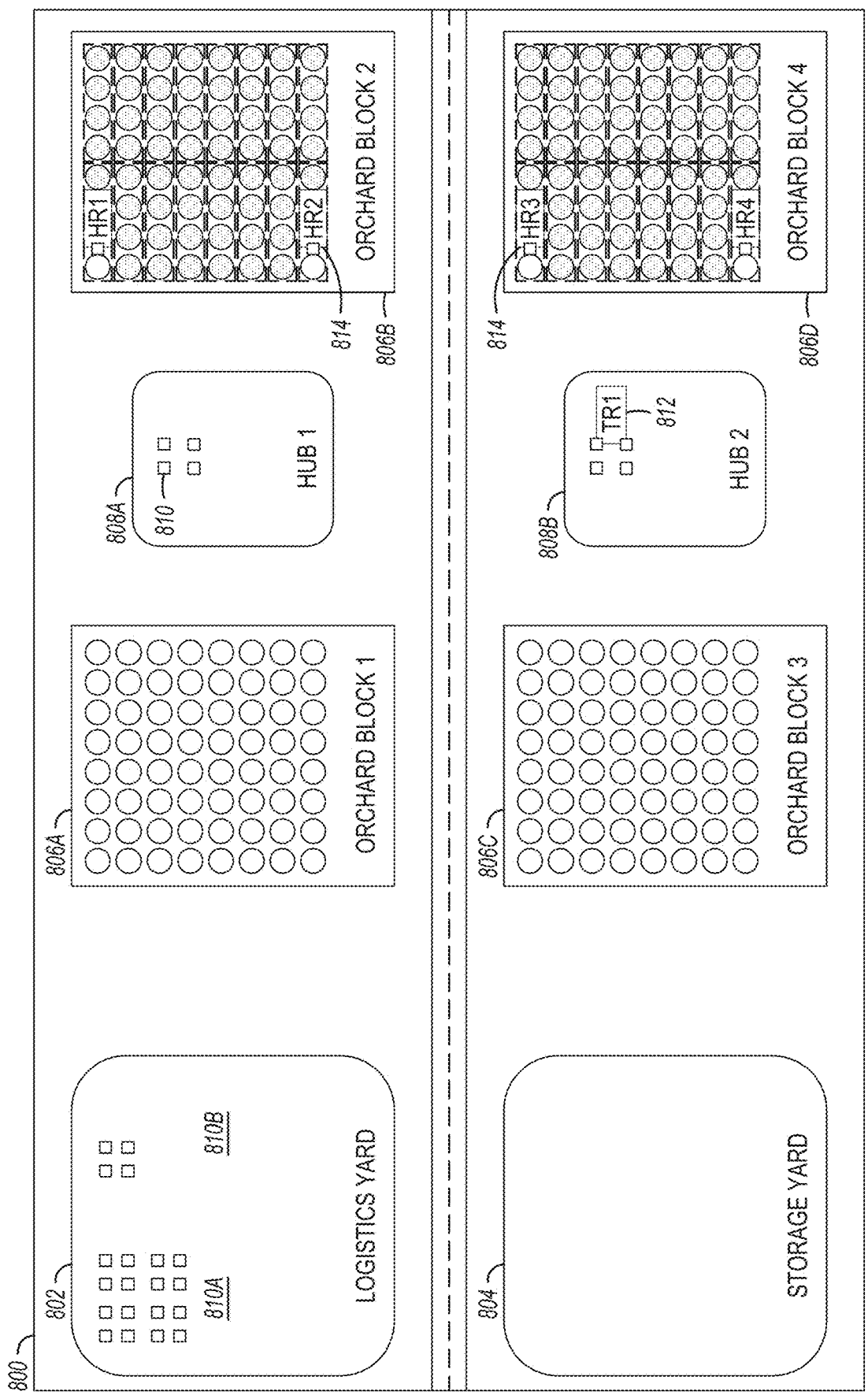
Figure 8H:
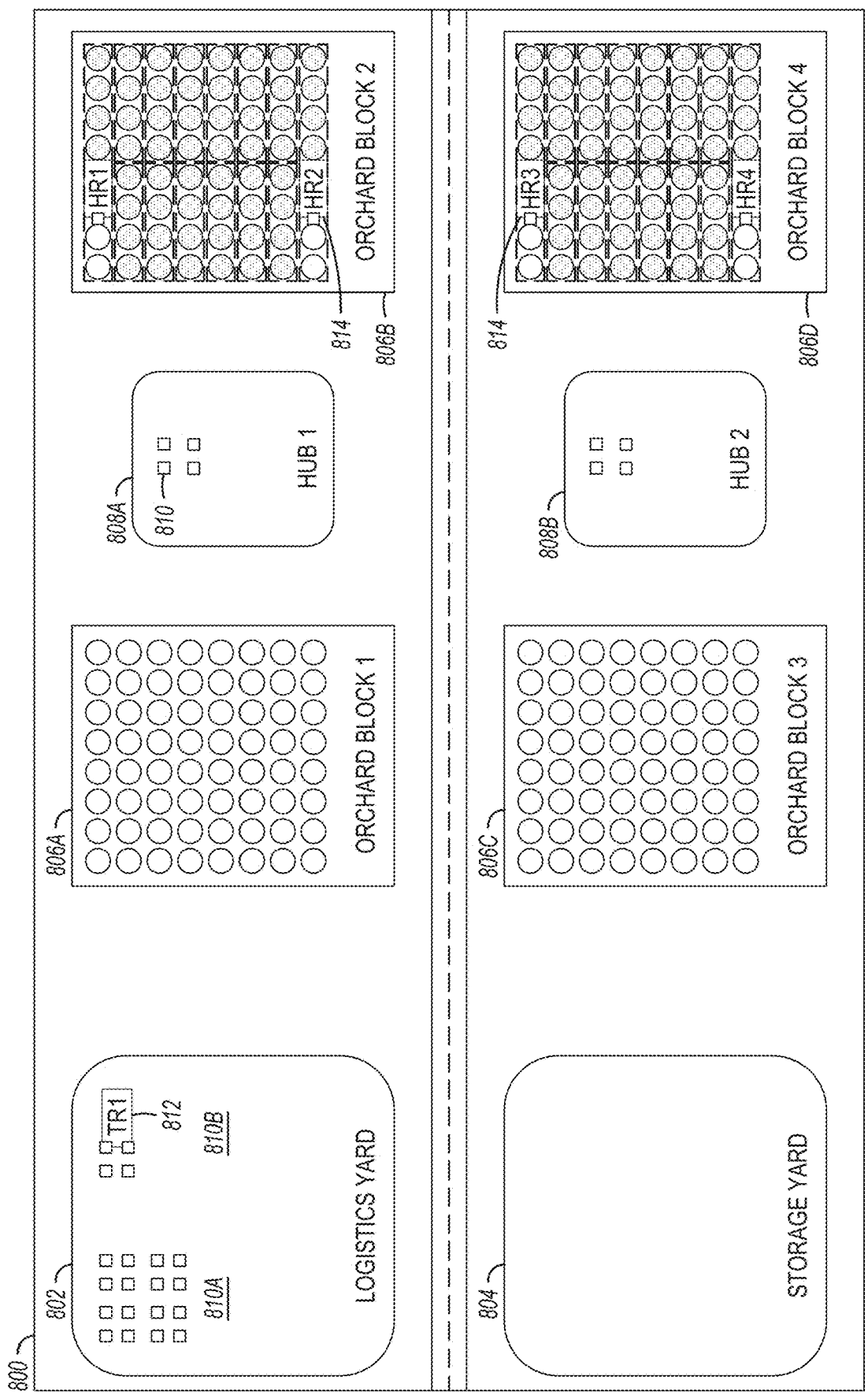

In FIG. 8G, it may be seen that the Transport Robot 812 fills the buffer of Hub 2 808B while the Harvest Robots 814 continue their segments. In FIG. 8H, the Transport Robot 812 returns to the Logistics Yard 802 (for more empty bins 810) waiting for the Hubs 808 to drop below their buffer level.

Figure 8I:
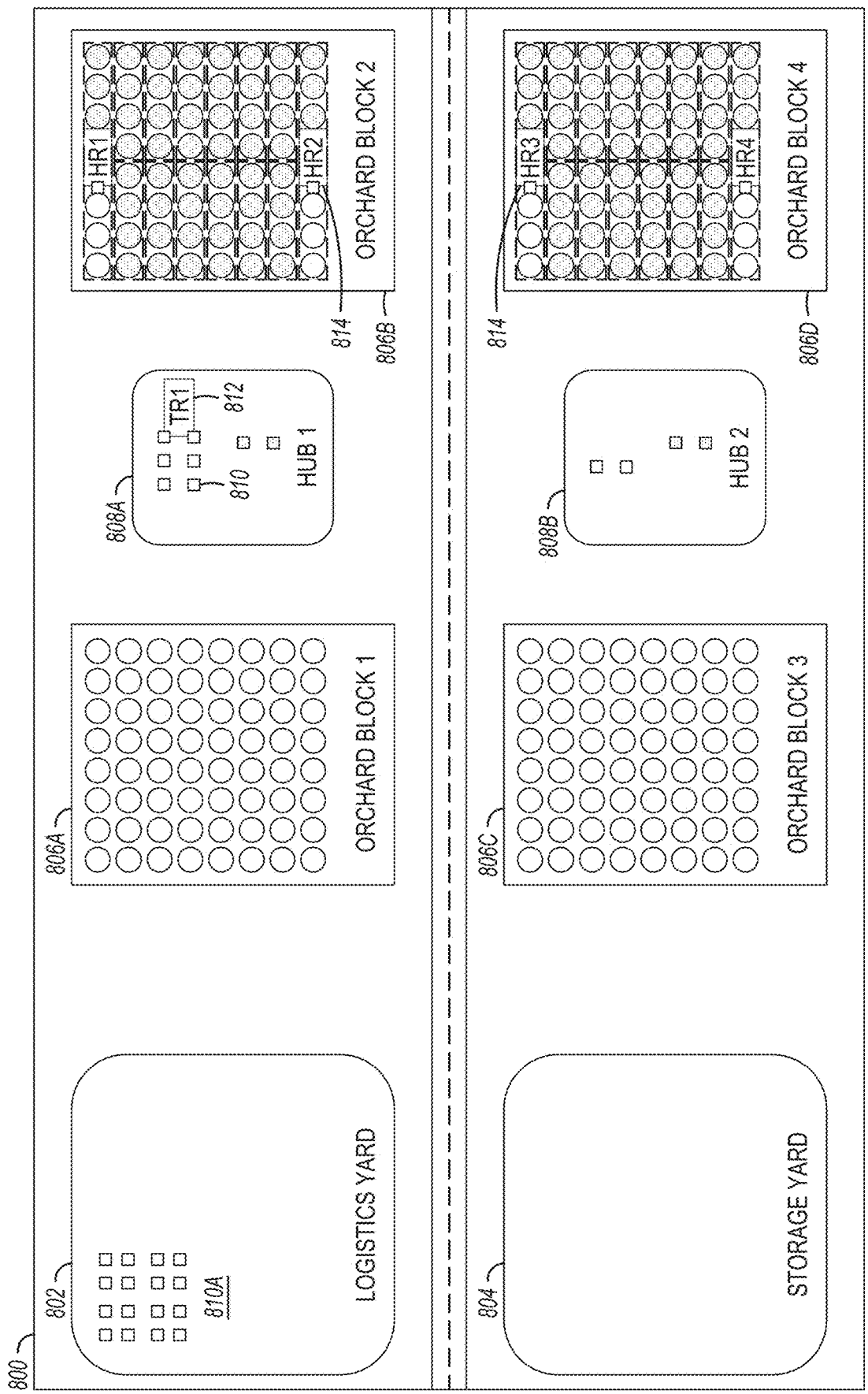
Figure 8J:
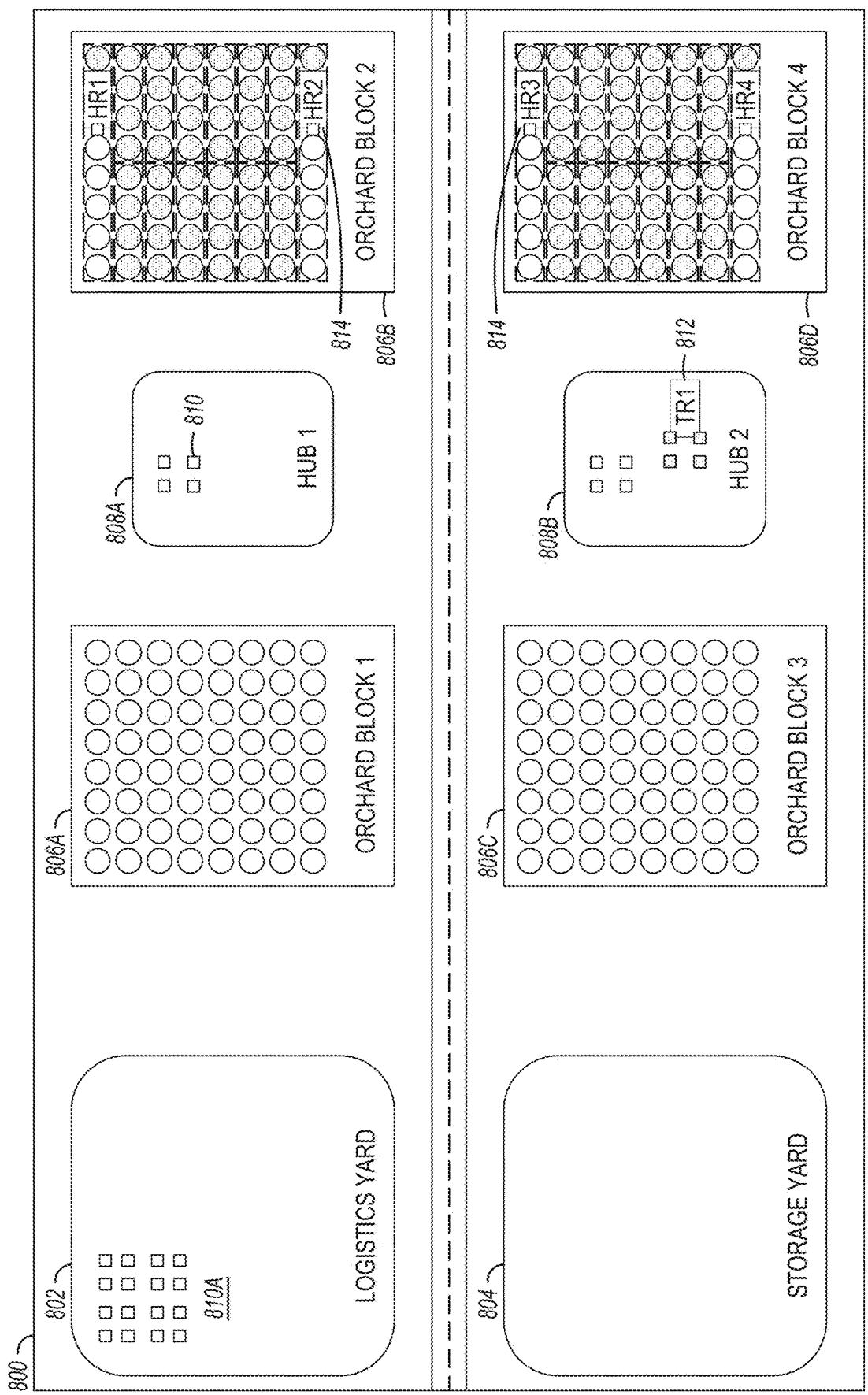

In FIG. 8I, the Harvest Robots 814 deliver filled bins to Hubs 808 and the Transport Robot 812 fills the Hub 1 808A buffer. In other words, the Harvest Robots 812 deliver their filled bins 810 to Hub 1 808A and Hub 2 808B, replacing them with empty bins 810 from those hubs 802. Because the Hubs 802 have fallen below their buffer levels, Tasks are generated to deliver 2 bins 810 to each Hub 808, to replenish these buffers. Simultaneously, because there are now filled bins 810 at each Hub 808, Tasks are generated to deliver these filled bins 810 back to the Logistics Yard 802. This process if illustrated in FIG. 8J which illustrates the Harvest Robots 814 delivering filled bins 810 to the hubs 808, and the Transport Robot 812 filling the Hub 2 808B buffer and retrieving full bins 810—i.e., the Transport Robot 812 completes bin 810 delivery, picking up filled bins 810 as it does so.

Figure 8K:
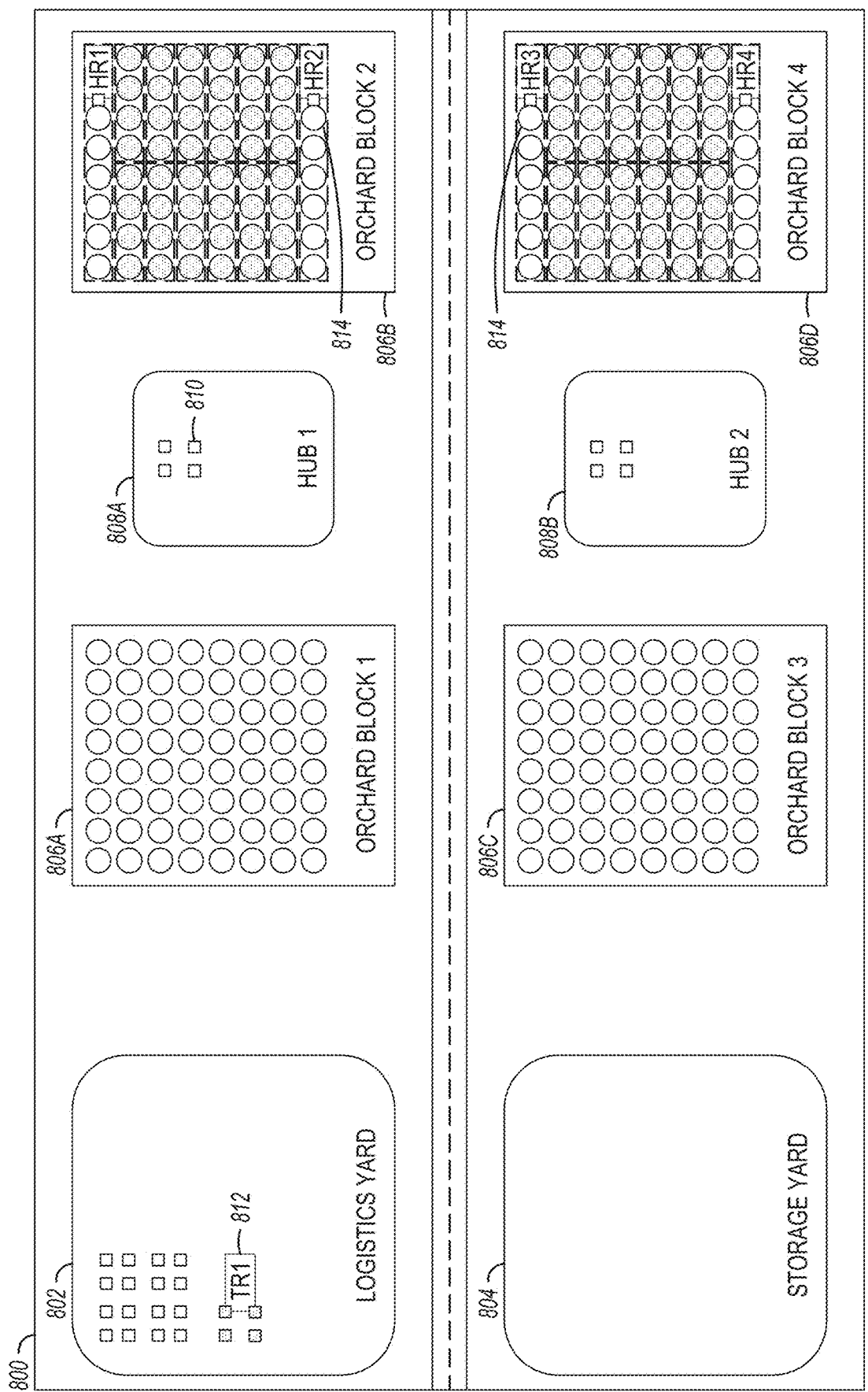

In FIG. 8K, the Transport Robot 812 returns full bins to the Logistics Yard 802 completing the second delivery task. The Harvest Robots 814 are nearing the end of their harvest segments, meaning that new delivery tasks will be generated shortly.

Again, this heuristic is demonstrated assuming the simplistic case of even fruit distribution. But it extends nicely to the case of non-even fruit distribution, because the faster consumption of bins by a denser cluster of fruit, or vice versa, will result in the buffer being depleted and refilled faster or slower, so the system will adjust using negative feedback.

It may also be noted that in FIGS. 8A-8K, the trees in each row of Orchard Blocks 806 are illustrated using circles—non-harvested trees are illustrated with filled circles and harvested trees are illustrated with clear/non-filled circles.

Search-Based Optimal Task Division

In order to optimally divide tasks, a search algorithm is required to traverse the set of task arrangements. This problem can be characterized as a form of the travelling salesman problem, making it NP-hard. Therefore fully optimal task allocation may be infeasible to reach in reasonable time for orchard-wide task-division. By keeping orchard Operations to a finite size, or by chunking Operations into sub-operations (e.g. at a per-block level) before computing task division, embodiments of the invention are able to find an optimal solution for a subset of the overall problem, without incurring a computation time too extreme.

Local Search/Global Heuristic Task Division

If one focuses on the distribution of resources out to trees and the collection of resources back to logistics areas, the problem can be simplified as the need to find a near-optimal solution based on resource distribution, that relies on a combination of local searches, and heuristics.

A good approximation of the amount of resources (e.g. bin space) that will be needed to complete a Task (e.g. harvest) on a particular tree given the state of that tree can be computed. Therefore, one can approximate how many trees can be operated on in a single Task. In the case of harvest, this may be estimated by pre-locating all harvest-able fruit (based on previously gathered field data), and using the volume of this fruit to estimate what portion of the bin's volume a particular tree's fruit will fill up.

Using this, a mapping of trees to resources can be determined. To do this, embodiments start with the most remote tree in the orchard, allocate it to the resources used by this Task, then expand to the most optimal neighbor. In one or more embodiments, the optimal neighbor is defined as the closest, and most remote, neighbor. If two trees are a similar distance, the more remote (e.g., with fewer and further neighbors) tree is selected. If choosing neighbor A over neighbor B would result in B losing its closest neighbor, and the cost to get from B to its closest neighbor is less than the cost of getting to neighbor A, then neighbor B is selected.

Embodiments of the invention continue to perform the mapping until enough trees are allocated to consume all of the resources available. Note that with these trees removed from the population, the next most remote tree is considered, and the process is repeated, until enough tasks are in place to occupy all robots. By starting with the most remote trees, as opposed to the least remote, local minima can be avoided such as when the nearest trees are harvested first, leaving many unreachable trees.

In one embodiment of this, the algorithm can be further based on the scarcity of operations that need to be completed within the orchard. An example of this is during harvest, when fruit is harvested based on its current ripeness. Rather than grouping trees by their physical locations, this embodiment groups fruit into harvest-able clumps, which are treated the same way as trees. The difference is that clumps will be accepted or rejected based on how much fruit is in a particular clump and based on the distance to the next nearest clump. The total "value" of each clump in a potential path is compared to the cost from taking that path, and if the result is negative, this path is rejected. This is based on tweak-able parameters such as the value of each fruit, the cost of navigation, and more.

There may be a more optimal solution for local distribution of resources, which may rely on geometric algorithms, search algorithms, or otherwise. Bins are then paired to the nearest hub to this Orchard Block, with Tasks generated to transfer bins from Logistics Yards to this Hub, and vice versa.

Figure 8L:
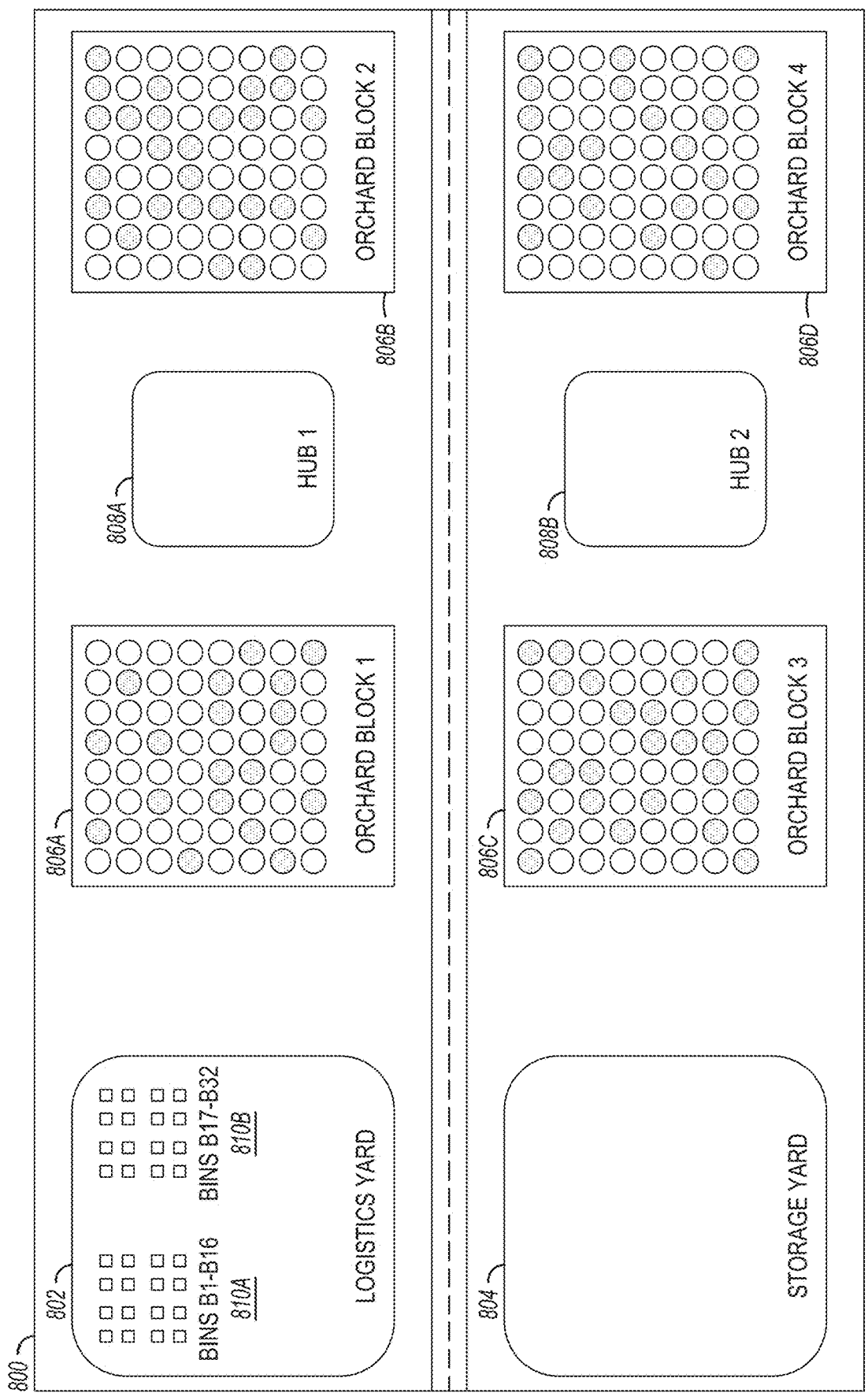
Figure 8M:
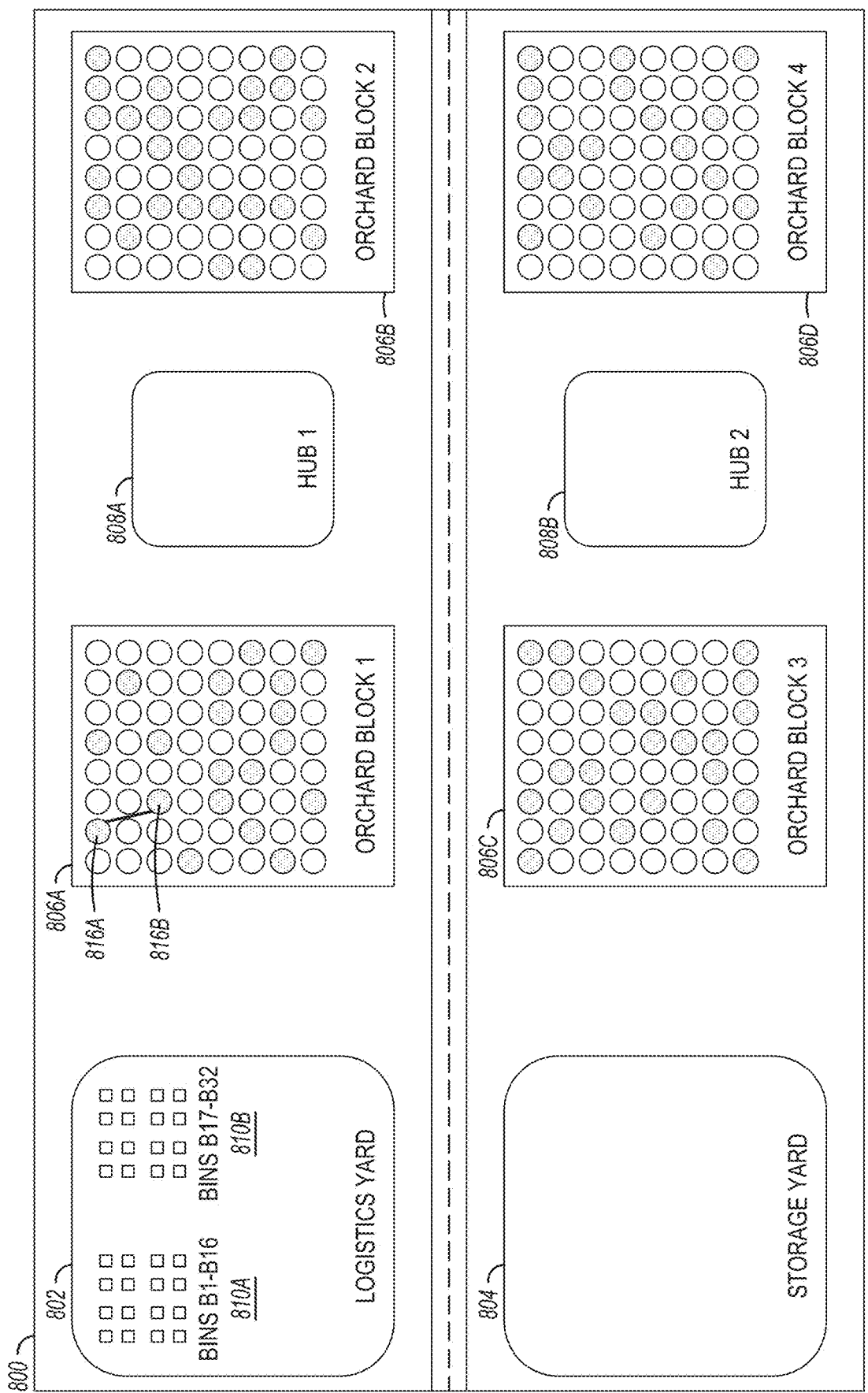
Figure 8N:
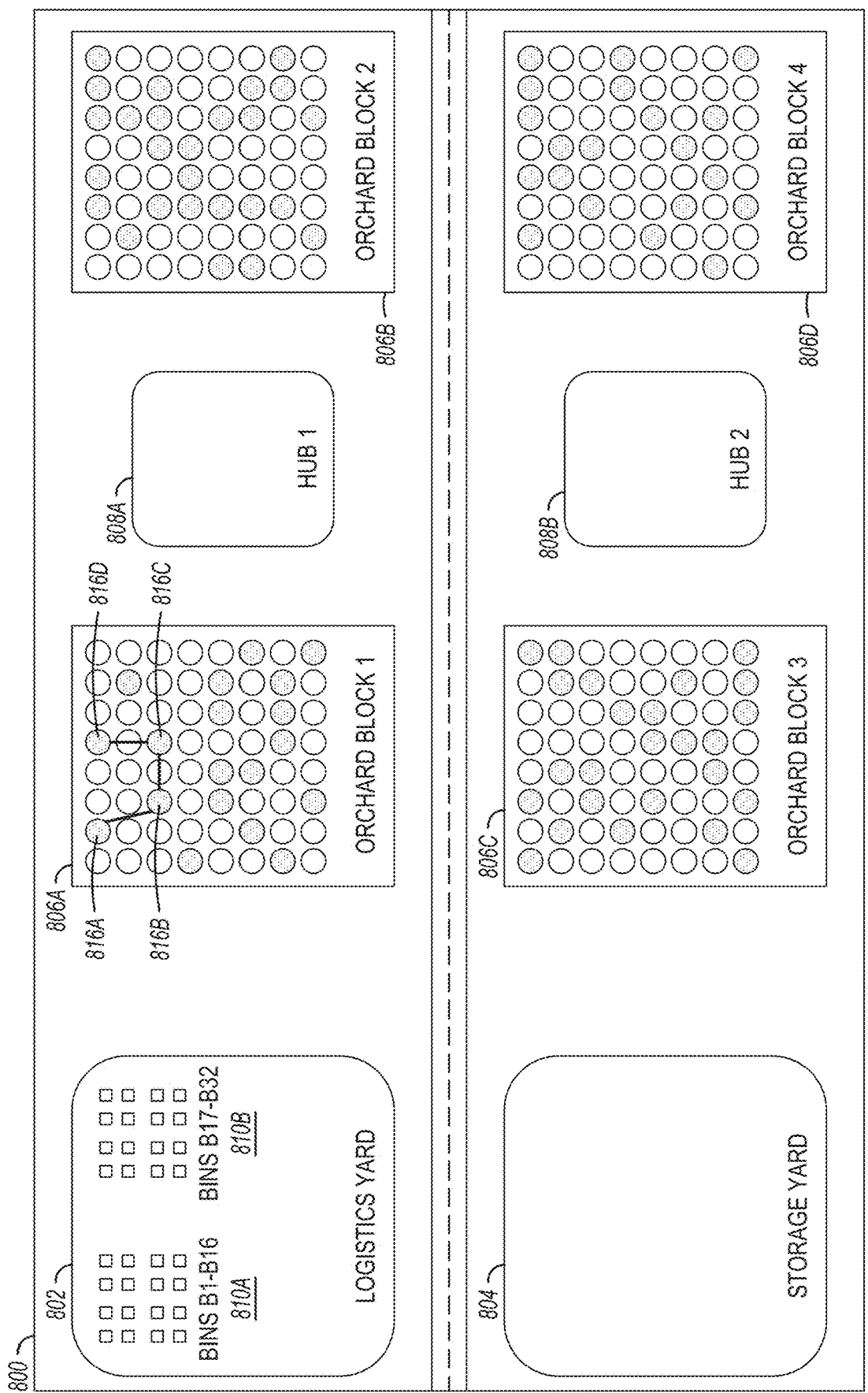
Figure 8O:
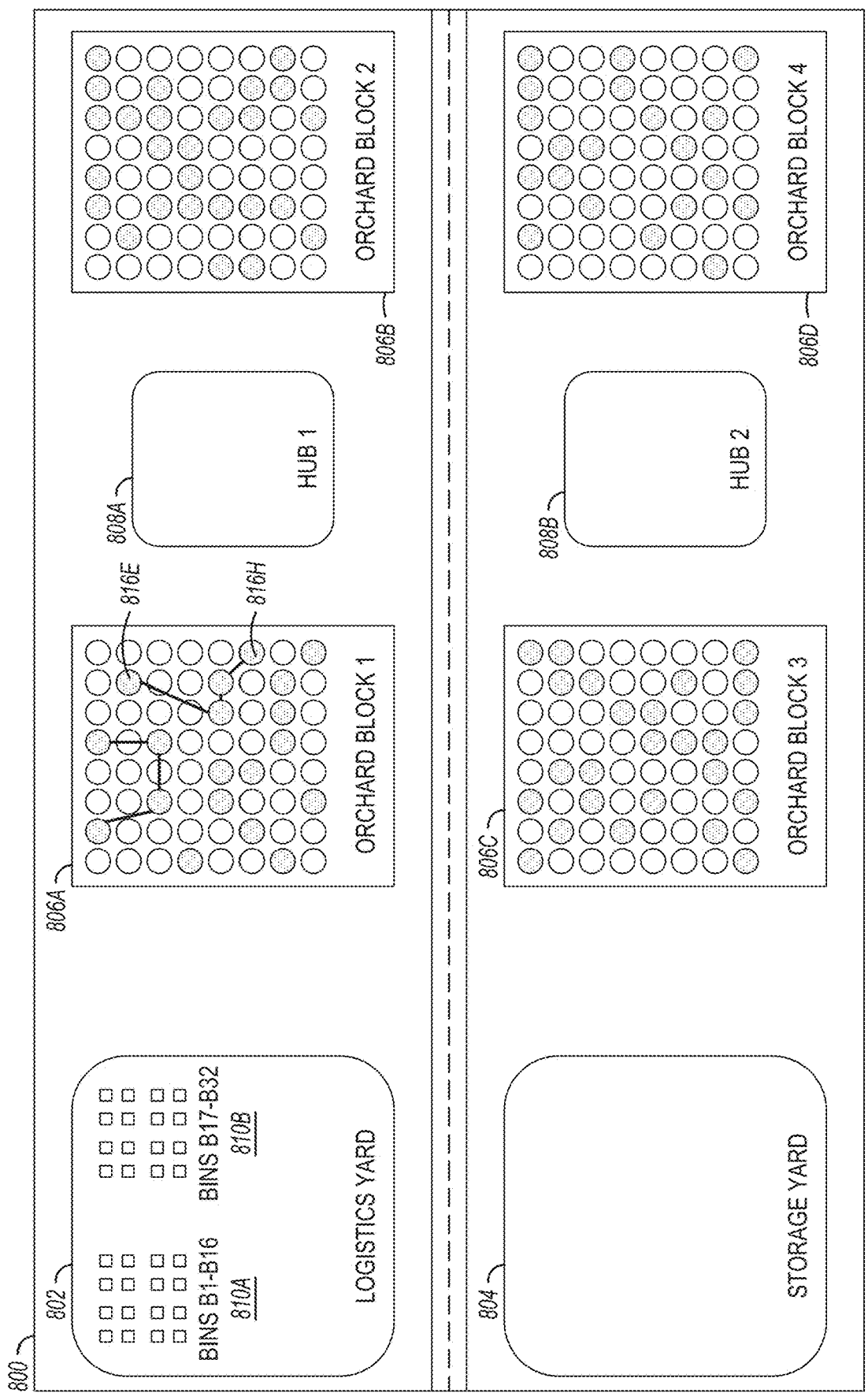

FIG. 8L illustrates another example with fruit unevenly distributed amongst trees (as reflected by full and empty circles representing trees in the Orchard Blocks 806). Referring now to FIG. 8M illustrating the first expansion, embodiments of the invention may start at the most remote tree 816A. This is computed by taking the average distance between each tree 816 and its neighbors. From this tree 816A, the process expands to its nearest neighbor 816B. The process continues from this tree 816B, expanding to the nearest neighbor until the entire bin capacity is consumed. FIG. 8N illustrates the continued expansion to trees 816C and 816D until bin capacity has been reached. Thereafter, as illustrated in FIG. 8O (for the second expansion), the process continues by selecting the next most remote tree 816E and repeating the process (e.g., to reach tree 816H). Thereafter, the process continues until all trees 816 are consumed by bins. FIG. 8P illustrates a completed process to reach all of the trees in the different Orchard Blocks 806.

Further to the above, because division and allocation occur in tandem, this algorithm is robust to variation in the system, and can adapt to inaccuracies in the fruit observation and planning phases. This algorithm also implicitly handles the case where the amount of fruit on each tree varies widely.

Optimization Based Routing and Resource Allocation

In one or more embodiments, an orchard is mapped spatially using the structure of a Voronoi Diagram. In this embodiment, the Voronoi seeds may be resources, or locations within the orchard. In order to generate these diagrams, an optimization algorithm is used, which may include algorithms such as K-means clustering, Lloyd's algorithm, or genetic algorithms.

A Voronoi diagram may be used to generate a plan for placement of resources around the orchard. These resources are placed at the seeds of the diagram, based on constraints. For example, fruit bins may be placed at the seeds of a Voronoi diagram. Based on measured fruit yield, a Voronoi diagram is used such that the fruit within each seed's region will be placed into the bin at that seed. This algorithm may be further constrained such that the fruit within each region is less than or equal to the capacity of each bin at the seed.

Alternatively, the yield per Voronoi region is calculated, and enough bins to fulfill the region's yield are distributed evenly within the region, in order to carry all fruit in that region. A smaller Voronoi diagram may further be constructed recursively within the region, such that a bin is placed at the seed of each smaller region, in total offering enough capacity for the entire yield.

The seeds of a Voronoi diagram may also be used to generate a series of waypoints within an orchard environment. These waypoints are then used for robot navigation.

In order to optimize the distribution of robot efforts throughout an orchard and to avoid collisions, an added cost may be assigned to two robots occupying the Voronoi region.

Genetic Task Division

A good approximation of the optimal solution is a genetic algorithm. This will not guarantee optimality, but it will vastly improve the search time, by instead finding a good approximation for optimality, meaning that embodiments only need to explore a much smaller portion of the search space.

Such a genetic algorithm would entail: (1) Randomly generating a series of task divisions, based on the total set of orchard operations to complete; (2) Selecting the most "fit" task division patterns, which best cluster tasks together spatially; (3) "Breeding" the task division patterns, randomly combining the traits of each division pattern with its mate; (4) If acceptance criteria is met, exiting; and (5) Otherwise, repeat from (2).

The implementation of Genetic Task Division may be based on existing solutions to the Multiple Traveling Salesman Problem, including Genetic Algorithm Inspired Descent (GAID) (which is described in Tamas Kalmar-Nagy, Giovanni Giardini, and Bendeguz Dezso Bak, "The Multiagent Planning Problem", Hindawi COmpleity Volume 2017, Article ID 3813912 (2017) which is incorporated by reference herein), Ant Colony Optimization, or otherwise.

Actor-Critic Task Division

Another good approximator for optimal task division is a reinforcement-learning algorithm, which outputs a series of tasks that the actor considers to be clustered well and in optimal order. This is a good application for an actor-critic model.

The input to the actor is the current system state, and the output is a proposed task. The input to the critic is a proposed task and the current system state, and the output is an estimate of the cost or value of that task.

In critic training, the resulting cost of all tasks taken is back propagated to the critic, and gradient descent is run at each time step to improve the estimate of the actual cost of that task.

In actor training, the actor and critic are chained together, and the actor weights are updated using gradient descent in order to improve the task proposed, indirectly increasing the critic's score of that task.

Because sequencing of tasks is an important component of this algorithm, neural networks containing LSTM neurons or a historical input provides for the ability of these networks to plan ahead, and to act based on recently taken actions.

Human-Robot Collaboration and Error Correction

In order to consider the non-autonomous case of Task Division 503B, where humans are collaborating with robots, robots may simply apply the same algorithms, as if these workers were "resources", that can be transported by robots, and that can be asked to complete actions within a task. Of course, people make their own decisions and will often behave differently from what an AI algorithm would propose. In fact, all of the above decisions are based on predictions about how the system will behave, which will often be slightly inaccurate. Bins will fill faster or slower than expected. Batteries and fuel tanks will run dry too quickly, robots will have unexpected hardware failures pulling them out of operation, and humans interacting with one robot may suddenly decide they want to start working with another robot. Therefore, Task Division 503B should occur on a finite-horizon basis. Embodiments of the invention may plan for the completion of the operation, but it may be assumed that the state of the system will periodically deviate far enough from the expected state of the system that replanning becomes necessary. Thus, tasks should only be allocated over a short time window to each robot (e.g., with a limit of how many tasks can be queued for a particular robot), such that embodiments can adapt at any time to sudden adversity. Such a process referred to as task capacity.

Task Allocation 503C

The description below returns to FIG. 9 for the details regarding Task Allocation 503C in accordance with one or more embodiments of the invention.

After tasks have been created by Task Division 503B (at step 908), they must be allocated to individual robots 506 (i.e., tasks are distributed at step 910), which may take the form discussed above. Some robots 506 may be able to complete certain Tasks more efficiently than others, and there are some Tasks that cannot be performed by some robots 506. For example, a transport robot could not complete a pruning task, and a harvest robot could not complete a canopy-scanning task.

Tasks can be allocated according to a few different embodiments, which vary in the complexity and optimality of task distribution. These include:

Heuristic-Based Task Allocation
Task Auction

Heuristic-Based Task Allocation

The simplest embodiment of heuristic-based task allocation is a simple nearest-robot algorithm. In this algorithm, each robot 506 has a series of Task types that it can support. When a task is ready for allocation, the Task Manager 503 allocates 503C the Task to the nearest available robot 506 that can complete the task, with some heuristic-based preference for some robot types over others to complete certain task types. This pairs well with heuristic-based Task Division 503B, such as when maintaining a buffer size of bins in each hub. These heuristics can be used to build near-optimal behavior, with minimal computation time.

In pseudocode, this looks like:

```
function allocate_task_nearest(robots, task):
    relevant_robots = get_relevant_robots(robots, task)
    min_distance_robot = minimum(distance(relevant_robots, task))
    min_distance_robot.allocate_task(task)
```

Task Auction

A more complex and optimal approach is a complete "Task Auction" for each Task to allocate. When the Task Manager 503 has a task to allocate, it queries the expected cost of completing the task for each robot 506, which is referred to as a "bid". The robot with the lowest bid will be given the task (i.e., the process finds the robot with the lowest expected completion cost at step 912).

Each robot 506 can report their bid by pre-planning the Task to estimate cost, or by adapting a cost from a similar task in their local cache (i.e., the task completion 914 is either estimated or adapted from prior/similar tasks). In order to do this, the robot 506 first breaks the task into its constituent actions. For example, a Task to deliver a bin from location $X_1$ to location $X_2$, includes navigating to location $X_1$, picking up the bin at $X_1$, navigating to location $X_2$, and delivering the bin at location $X_2$. If we consider these sub-tasks to be actions $a_1$ through $a_4$, then the cost of these actions is $C(a_1)$ through $C(a_4)$, respectively. Note that "cost" will usually correspond closely with the amount of time taken by an action, but can include other factors such as fuel costs, environmental costs, and labor costs.

$a_1$ is an action to navigate from the robot's current location $X_0$ to $X_1$, so this can be estimated using the distance between the two locations. Alternatively, the robot 506 can plan a path between these locations for a more accurate estimate. If a similar route has been taken in the past, the robot 506 can retrieve the cost associated with that route from a cache, using it for the estimate rather than re-planning the path.

The cost of picking up a bin, or $C(a_2)$ will be estimated based on past experience completing this action. This process will entail fine control of the robot 506 to engage with the bin, and then trajectory planning to lift the bin off the ground. The engagement with the bin can be considered to be a sub-action, and an expected cost will be computed based on the average of past bin-engage actions, stored in the cost cache. The bin-lift trajectory will be simple in comparison, so building a trajectory plan, or using a past trajectory, will give a good estimate of the cost.

The cost of transferring the bin from $X_1$ to $X_2$, or $C(a_3)$, is calculated in the same way as $C(a_1)$, except that the path is computed from $X_1$ to $X_2$ rather than from $X_0$ to $X_1$.

The cost to dump the bin onto the ground, or $C(a_4)$, is simple to compute, because $a_4$ is a simple action. The action consists of a trajectory to place the bin on the ground, and then a simple path to disengage the robot 506 from the bin. In order to compute the cost, the robot 506 plans a trajectory for each of these sub-actions, and adds them together.

The total cost $C(T_1)$ is simply the sum of these costs, or $C(T_1)=C(a_1)+C(a_2)+C(a_3)+C(a_4)$. After computing each of these costs, their values are stored in a cache, which can be referenced by similar actions. This cache allows for robots 506 to quickly estimate the cost of completing a task without planning the entire task out. For paths and trajectories, algorithms such as A* path caching or robot trajectory caching can be used. This functions slightly differently for different action types. For example, bin engagement can be cached as a simple historical average of bin engagement costs.

In the general case, the cost of Task T is:

$$C(T)=\Sigma_{i=1}^{n}C(a_i)$$

If the lowest bidder for a Task (A) happens to be engaged in another Task when a bid is offered, it can put its own Task onto the auction market. If another robot (B) 506 can take the Task, such that the total resulting cost is decreased when making the trade, then A passes off its old task to B, and tasks on the new Task. These simple rules enable complex multi-actor cooperation, resulting in a good approximation of optimal Task distribution.

The core concept of this market-style system is that each robot type has a set of tasks it will generally be better at, and thus it will tend to specialize in those tasks. But say that a harvest robot has been charging in a logistics yard and is heading out to the field. It would be wasteful for that robot to head out without an empty bin. This cost-based system causes the harvest robot to bring a bin with it, without any programming telling it to do so. Another key feature is that if no transport robot is able to bring a bin from the block out into a hub, and no transport robot can bring a bin to the logistics yard, the harvest robot will take on all required Tasks to complete the Operation.

In pseudocode, this looks like:

```
function allocate_task_auction(robots, task):
    min_cost = infinite
    min_cost_robot = None
    for robot in robots:
        bid = robot.estimate_cost(task)
```

```
if bid < min_cost:
   min_cost = bid
   min_cost_robot = robot
   min_cost_robot.allocate_task(task)
```

Heartbeat and Error Handling

For any case of task allocation, robots may be expected to occasionally fail. Another function of the Task Manager 503 is to track periodic heartbeats on each robot, periodically checking the status of active Tasks. Eventually, sufficiently stale Tasks which are not accounted for will be taken away from the current owner, and reallocated to a new robot.

Multi-Task Allocation

Because robots often have a capacity larger than 1 for a particular resource, they can consume multiple Tasks at the same time. For example, a harvest robot with a capacity for 2 bins could take on 2 harvest tasks at once, and a transport robot with a capacity for 4 bins could transport 4 bins to a hub at once. When a robot accepts Tasks, it can keep consuming tasks until it has reached its capacity. In the heuristic case, new Tasks will be given to robots whose current task has the closest ending position to the new Task's starting position. In the case of the auction, this same effect would happen naturally because the added cost of completing such a Task would be minimal for whichever robot was engaged in nearby activity.

Task Planning and Execution

After a task is designated for a particular robot (e.g., by finding the robot with the lowest expected completion cost at step 912, the Task Manager 503 sends this Task over a wireless network to that robot 506 (e.g., by distributing the task at step 910), using a message including information about the goals of the task, and relevant corresponding data about the orchard state, and other relevant robots 506. Upon receipt, the robot 506 returns a similar message accepting the Task, or rejecting it. This decision occurs according to the robot's internal state machine 916. If the robot 506 is in an IDLE state or has an active Task, but has extra task capacity, the Task will be accepted. If the robot 506 is not in one of these states, or does not otherwise have the capability to complete the Task, it will be rejected. As mentioned previously, the Task Manager 503 can also send a tentative Task to the robot 506 in order to get a cost estimate, such that the robot plans the Task but does not execute it. The cost of a Task is the sum of the costs of each Action in the Task. Thus, as illustrated in FIG. 9, the robot state machine 916 may be based on sensor feedback 918 and state estimation+ 3D mapping 920 of the robot 506.

Action Generation 922

If the robot 506 accepts the Task, it proceeds to the Action Generation process 922. Here, the robot 506 breaks the Task into a series of Actions, where each Action consists of a single set of motions by the robot 506. Example Actions include driving from point A to point B, picking up a bin, harvesting a particular fruit, moving a particular actuator from configuration C to configuration D, or taking a picture of a particular tree. Each of these Actions consist of a start state of the robot 506 and an end state, such that when completed in sequence, and in some cases in parallel, the Task will be completed by the robot 506. If Action Generation 922 is not successful, a Task Failure is returned to the Task Manager 503. The Task Manager 503 can then amend the Task before re-allocating it to the most appropriate robot 506, which may or may not be the same robot 506.

Trajectory Planning 924

Next, the action plan is forwarded to Trajectory Planning 924. This can occur in parallel or in sequence with Action Generation 922. For each Action, a Trajectory is generated, which can take different forms depending on the set of actuators involved. For robot 506 navigation, standard Autonomous Vehicle techniques are used. For actuators attached to the system, including robotic arms, standard motion planning techniques are used. The result includes a set of forces, accelerations, velocities, positions, timesteps, digital I/O, etc., as well as software API commands, that when executed by the relevant actuators, will result in the completion of the Action. This Trajectory can then be used to execute an action (i.e., control actuators at 926), and it can also be used to estimate the cost of the action.

Trajectory Planning 924 failures will cause an error to be returned to Action Generation 922. The Action Generation process 922 can choose to amend the Action plan, and send this updated plan to Trajectory Planning 924, or it can recursively fail Action Generation 922, raising the error to be a failed Task.

During the Trajectory Planning 924 process, the robot 506 has access to a cache of past Trajectories. These Trajectories can be used to quickly plan similar trajectories, at minimal cost. This is based on standard Trajectory Caching techniques.

Action Costs

Action Costs are computed based on weighted parameters including fuel/energy consumption, time spent, actuator effort, human assistance, part degradation, opportunity costs, etc. In one embodiment, economic data stored in "Data Amalgamation" can be used to estimate the actual dollar cost of each of these factors, rather than a parameterized cost. Users can also input "externalities" that are not accounted for in market prices, for example, carbon dioxide emissions, and loss of soil quality.

This can be described as:

$$C(a) = \sum_{i=1}^{n} C(Tr_i)$$

Where $C(Tr_i)$ is the cost of Trajectory i. In turn, $$C(Tr) = w_t C(t) + w_f C(f) + w_l C(l) + w_d C(d) + w_o C(o) + w_e C(e) + \ldots$$

Where:
 $w_t$ is the weight given to action time, $C(t)$ is time cost.
 $w_f$ is the weight given to fuel cost, $C(f)$ is fuel cost.
 $w_l$ is the weight given to assistant labor, $C(l)$ is labor cost.
 $w_d$ is the weight given to equipment degradation, $C(d)$ is the cost of equipment degradation.
 $w_o$ is the weight given to opportunity cost, $C(o)$ is the opportunity cost.
 $w_e$ is the weight given to externalities, $C(e)$ is the cost of externalities incurred.
 etc.

Actuator Control 926

Finally, planned Trajectories are forwarded to execution. Here, planned forces, velocities, and positions are executed as specified in the Trajectory at hand, correcting for errors in real time based on sensor feedback and standard estimation and control techniques. Sensor feedback 918 can include encoders, force sensors, accelerometers and more.

As execution (via actuator control 926) is completed, all commands are filtered through a safety layer, which verifies that all efforts and velocities are within reasonable bounds, the actuator position does not leave a safe range, the robot 506 remains within a geofence, and that no humans are within the reach of the actuators.

If the Trajectory is not completed successfully, a failure is raised to the Trajectory Planning 924 process. Trajectory Planning 924 will either re-plan the trajectory, or recursively raise the error to the Action Generation 922 level.

Sensor Feedback, State Estimation and 3D Mapping

As the robot 506 navigates throughout an orchard 928, the sensors collect a wide range of sensor data, as discussed above. This data is used to map the area around the robot 506, getting a local understanding of the state of the world (e.g., in state estimation+3D mapping 920), as discussed in Data Amalgamation. In turn, this understanding of the world state is used as feedback to inform the robot 506 about the completion of each Trajectory, Action, and Task, recursively.

For a pruning action, for example, the robot 506 executes a calculated trajectory to move a pruning end effector to the designated branch, camera data and encoder data is used to ensure that the robot arm is positioned correctly. If the camera data and encoder data (i.e., via sensor feedback 918) gives a positive result, then the Trajectory is completed, otherwise it is failed, and an error raised to Trajectory Planning 924. Then, another calculated trajectory is used to actuate the robot's pruning tool removing the branch from the tree. Force and positional sensors in the end effector ensure that the forces associated with cutting a branch were achieved, and the position sensor ensures that the end effector is fully actuated. Again, sensor data is used to decide whether Trajectory execution was successful. Then, 3D camera data is used to visually inspect the branch and further ensure that it has been removed from the tree. If the branch was removed successfully, the Action is completed, otherwise the Action is failed, and must either be replanned, or the Task failed.

Task Completion

Task Completion is a recursive process. After all Trajectories in an Action are completed, and sensor feedback 918 indicates that the objective of the Action is complete, the Action is completed. After all Actions in a Task have been completed, and sensor feedback 918 indicates that the objective of the Task has been completed, a message is returned to the Task Manager 503 corresponding to the Task to indicate that it is complete. As discussed above, if at any level a Task component fails, the level above is able to adapt and issue an amended command, or to recursively fail that Task component. If the Task component reaches the highest level, the Task fails.

Along with a Task Completion message, 3D map updates that were detected during the course of the action are included (e.g., at step 920). These allow for the Task Manager 503 to update the global state of the orchard, as discussed in Data Amalgamation.

The expected cost of an Action and/or Task may not always reflect the actual achieved cost. So at Task Completion, the actual motions taken by the robot 506 are used to compute the real incurred cost. This cost is also stored in the path cache, which is used to get better estimates of Task cost in the future, for similar actions and Tasks.

Robot State Machine 916

The robot 506 maintains a state machine 916 for Tasks. Upon Task acceptance, the robot 506 transitions to a busy state, which may optionally include capacity to queue up sequential Tasks. Other states include remote control, manual control, emergency stop, fault, soft stop, and more.

Below the Task state machine, the sequence of Actions within a Task comprises a secondary state machine. At the end of each Action, the robot 506 completes the state corresponding to this Action, transitioning to the state corresponding to the next Action. As such, the Action state machine has a flexible structure, with ordering of states determined at the level above Action Planning level.

Logical Flow

Figure 10:
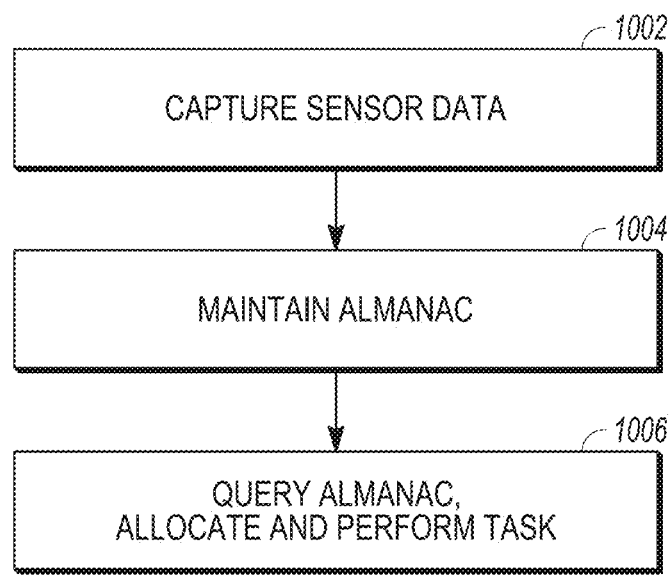
FIG. 10 illustrates the logical flow for managing an orchard in accordance with one or more embodiments of the invention.

FIG. 10 illustrates the logical flow for managing an orchard in accordance with one or more embodiments of the invention.

At step 1002, sensor data that represents a first state of the orchard, is captured via one or more sensors. The sensor data is captured as the one or more sensors are traveling through the orchard (e.g., on an orchard cart). The capture of the sensor data may further include capturing environmental data, capturing economic data, and combining the sensor data with the environmental data and the economic data to represent the first state of the orchard (which may be represented in three-dimensions and color).

At step 1004, an almanac is maintained. The almanac includes/provides a state library of sequential states of a representative orchard, and a task library for one or more tasks to be performed to transition between the sequential states. In embodiments of the invention, the almanac may be maintained by ingesting the first state of the orchard, and then using machine learning to determine a subsequent state of the sequential states to transition to from the first state. Such machine learning recursively updates an orchard model based on prior transitions between the sequential states. The use of the machine learning may further include generating a structural computer representation of a physical structure of a plant in the orchard and predicting a yield quality of the plant based on the structural computer representation, the orchard model, and prior state transitions. The generation of the structural computer representation may include applying a convolutional neural network (CNN) to classify parts of the plant using three-dimensional (3D) data, and applying tree structural heuristics to constrain the structural computer representation.

In embodiments of the invention, the use of the machine learning may also include: generating a structural computer representation of a physical structure of a plant in the orchard; ingesting nutritional data collected from the orchard; ingesting water data collected from the orchard; predicting, based on prior state transitions, a yield quality of the plant based on the structural computer representation, the orchard model, the nutritional data and the water data; and based on the predicting, determining a nutrition and water to be applied to the plant to maximize yield. Such a prediction may include statistically modeling weather events to account for environmental randomness.

In addition, in embodiments of the invention, the use of the machine learning may include: generating a structural computer representation of a physical structure of a plant in the orchard, wherein the structural representation comprises young fruit; evaluating, based on prior state transitions, the young fruit in the structural representation to determine interactions that result in a reduced yield throughout growth of the plant; and based on the evaluating, determining fruit spacing on the plant. In such embodiments, the evaluating may include predicting, using a neural-network, future fruit growth based on neighboring fruit, visual health indicators, and historical environmental data. Such a neural network may be trained based on gradient descent and past fruit growth.

In one or more embodiments of the invention, the machine learning further includes: generating a pattern representing a placement of plants in the orchard; evaluating, based on prior state transitions, the pattern to determine a maximum yield throughout growth of the plants; and based on the evaluating, determining an updated pattern for spacing the plants in the orchard. In such an embodiment, the pattern may be a tiled hexagonal pattern where one or more robots navigate the tiled hexagonal pattern along three (3) axes of the hexagon.

At step 1006, a task manager queries the almanac to identify a first task of the one or more tasks and allocates the first task to one or more robots that perform the first task. In embodiments of the invention, the task manager may divide the first task into multiple subtasks (e.g., based on a sum of a cost of the multiple subtasks, based on rows of the orchard and heuristics, and/or based on a spacing between rows of the orchard and a spacing between multiple robots of the one or more robots).

In one or more embodiments of the invention, the task manager maintains a task division library that maintains a history of past task divisions. Further, the task manager evaluates past task divisions to determine an operation time corresponding to when these task divisions were executed. The task manager maintains a machine learning model to represent task division and operation times and uses the machine learning model to evaluate the expected operation time of a given task division. The task manager trains/updates this machine learning model based on a task division's achieved operation time, as compared to the expected operation time.

In one or more additional embodiments of the invention, the one or more robots may include a transport robot (e.g., that transports bins to and from a hub to a logistics yard) and a harvest robot (e.g., that transports bins from plants in the orchard to and from the hub). In such an embodiment, the task manager may divide the first task into multiple subtasks that are then assigned to the transport robot and the harvest robot, where each hub maintains a buffer of one or more bins. Alternatively, or in addition, the first task may be divided into multiple subtasks based on clumps of plants in the orchard, with prioritization assigned based on a sparsity of the plants within the clumps. Alternatively, or in addition, the first task may be divided into multiple subtasks based on clumps of fruit in the orchard, with prioritization assigned based on a sparsity of the fruit within the clumps.

In one or more additional embodiments of the invention, global heuristics may be used with a local search algorithm to find a near optimal solution. For example, the first task that is assigned may include multiple subtasks that are allocated to different robots of the one or more robots. Further, the allocation may be based on an estimate of task cost on a per-robot basis, wherein the task cost is further based on an ability of each of the one or more robots to complete the first task.

In one or more embodiments of the invention, the task manager maintains a task allocation library that maintains a history of past task allocations. Further, the task manager evaluates past task allocations to determine a task cost corresponding to when these task allocations were executed. The task manager maintains a machine learning model to represent task allocation and task cost and uses it to evaluate the expected task cost of a given task allocation. The task manager trains/updates this machine learning model based on a task allocation's achieved task cost (of a given task), as compared to the expected task cost.

Computer Hardware Environment

Figure 11:
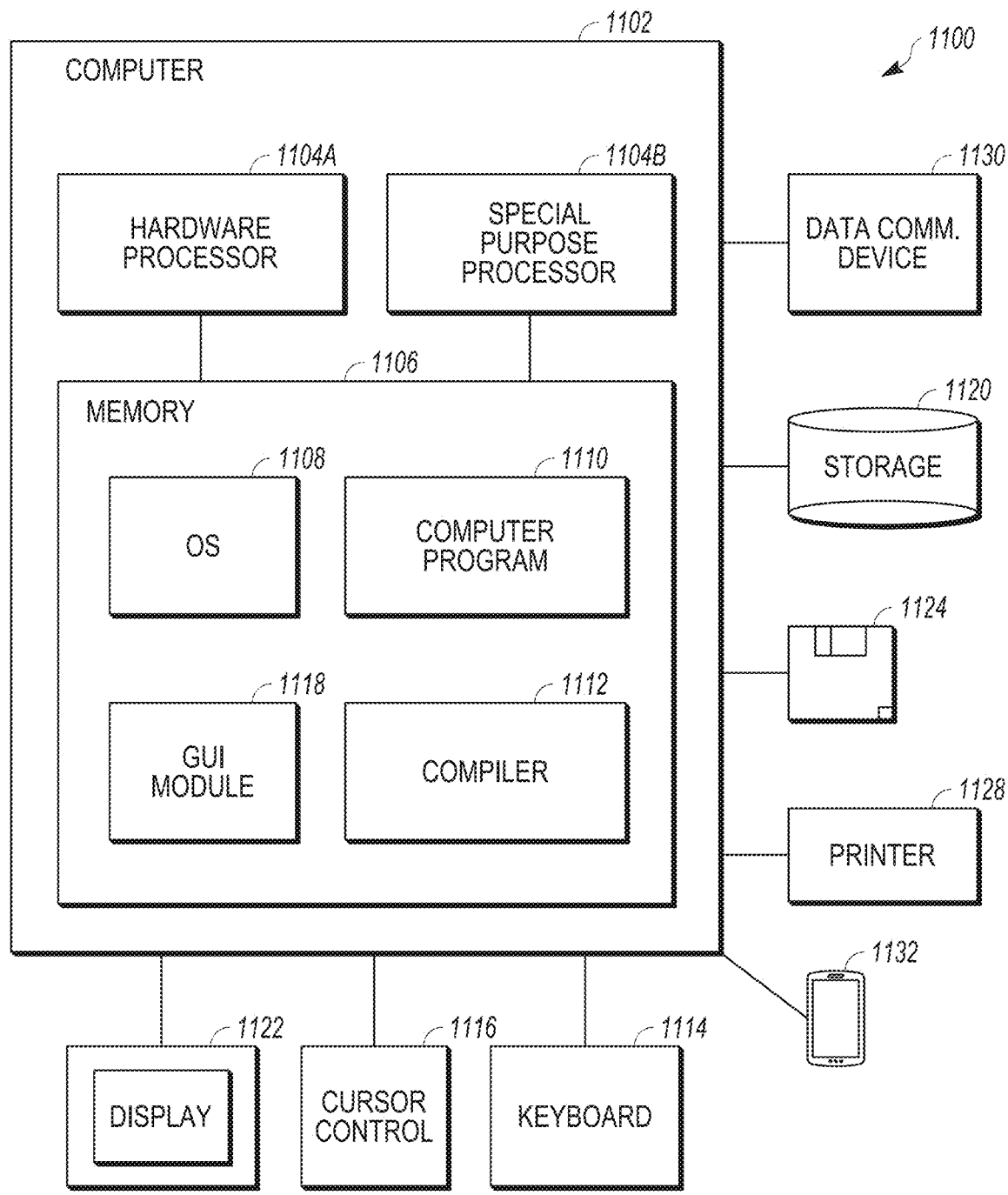
FIG. 11 is an exemplary hardware and software environment used to implement one or more embodiments of the invention.

FIG. 11 is an exemplary hardware and software environment 1100 (referred to as a computer-implemented system and/or computer-implemented method) used to implement one or more embodiments of the invention. The hardware and software environment includes a computer 1102 and may include peripherals. Computer 1102 may be a user/client computer, server computer, a database computer, or may be integrated/part of the orchard robot and/or the server that communicates with a second computer 1102 on the orchard robot. For example, in one or more embodiments the computer 1102 may be implemented/integrated into the compute box 310 illustrated in FIG. 3. The computer 1102 comprises a hardware processor 1104A and/or a special purpose hardware processor 1104B (hereinafter alternatively collectively referred to as processor 1104) and a memory 1106, such as random access memory (RAM). The computer 1102 may be coupled to, and/or integrated with, other devices, including input/output (I/O) devices such as a keyboard 1114, a cursor control device 1116 (e.g., a mouse, a pointing device, pen and tablet, touch screen, multi-touch device, etc.), a printer 1128, a wired or wireless gamepad, buttons, joystick controller, and/or sensors (as described above and in the co-pending patent application entitled "Orchard Cart and System" with the inventors Lucas Buckland and Connor Buckland, filed on the same date herewith, which is incorporated by reference herein). In one or more embodiments, computer 1102 may be coupled to, or may comprise, a portable or cellular/media viewing/listening device 1132 (e.g., an MP3 player, IPOD, Android Tablet, Apple Tablet, NOOK, portable digital video player, cellular device, personal digital assistant, etc.). In yet another embodiment, the computer 1102 may comprise a multi-touch device, mobile phone, gaming system, internet enabled television, television set top box, or other internet enabled device executing on various platforms and operating systems.

In one embodiment, the computer 1102 operates by the hardware processor 1104A performing instructions defined by the computer program 1110 under control of an operating system 1108. The computer program 1110 and/or the operating system 1108 may be stored in the memory 1106 and may interface with the user and/or other devices to accept input and commands and, based on such input and commands and the instructions defined by the computer program 1110 and operating system 1108, to provide output and results.

Output/results may be presented on the display 1122 or provided to another device for presentation or further processing or action. In one embodiment, the display 1122 comprises a liquid crystal display (LCD) having a plurality of separately addressable liquid crystals. Alternatively, the display 1122 may comprise a light emitting diode (LED) display having clusters of red, green and blue diodes driven together to form full-color pixels. Each liquid crystal or pixel of the display 1122 changes to an opaque or translucent state to form a part of the image on the display in response to the data or information generated by the processor 1104 from the application of the instructions of the computer program 1110 and/or operating system 1108 to the input and commands. The image may be provided through a graphical user interface (GUI) module 1118. Although the GUI module 1118 is depicted as a separate module, the instructions performing the GUI functions can be resident or distributed in the operating system 1108, the computer program 1110, or implemented with special purpose memory and processors.

In one or more embodiments, the display 1122 is integrated with/into the computer 1102 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 1102 according to the computer program 1110 instructions may be implemented in a special purpose processor 1104B. In this embodiment, some or all of the computer program 1110 instructions may be implemented via firmware instructions stored in a read only memory (ROM), a programmable read only memory (PROM) or flash memory within the special purpose processor 1104B or in memory 1106. The special purpose processor 1104B may also be hardwired through circuit design to perform some or all of the operations to implement the present invention. Further, the special purpose processor 1104B may be a hybrid processor, which includes dedicated circuitry for performing a subset of functions, and other circuits for performing more general functions such as responding to computer program 1110 instructions. In one embodiment, the special purpose processor 1104B is an application specific integrated circuit (ASIC). In alternative embodiments, the special purpose processor 1104B may be a graphics processing unit (GPU).

The computer 1102 may also implement a compiler 1112 that allows an application or computer program 1110 written in a programming language such as C, C++, Assembly, SQL, PYTHON, PROLOG, MATLAB, RUBY, RAILS, HASKELL, or other language to be translated into processor 1104 readable code. Alternatively, the compiler 1112 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1110 accesses and manipulates data accepted from I/O devices and stored in the memory 1106 of the computer 1102 using the relationships and logic that were generated using the compiler 1112.

The computer 1102 also optionally comprises an external communication device such as a modem, satellite link, Ethernet card, or other device for accepting input from, and providing output to, other computers 1102.

In one embodiment, instructions implementing the operating system 1108, the computer program 1110, and the compiler 1112 are tangibly embodied in a non-transitory computer-readable medium, e.g., data storage device 1120, which could include one or more fixed or removable data storage devices, such as a zip drive, floppy disc drive 1124, hard drive, CD-ROM drive, tape drive, etc. Further, the operating system 1108 and the computer program 1110 are comprised of computer program 1110 instructions which, when accessed, read and executed by the computer 1102, cause the computer 1102 to perform the steps necessary to implement and/or use the present invention or to load the program of instructions into a memory 1106, thus creating a special purpose data structure causing the computer 1102 to operate as a specially programmed computer executing the method steps described herein. Computer program 1110 and/or operating instructions may also be tangibly embodied in memory 1106 and/or data communications devices 1130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1102.

Figure 12:
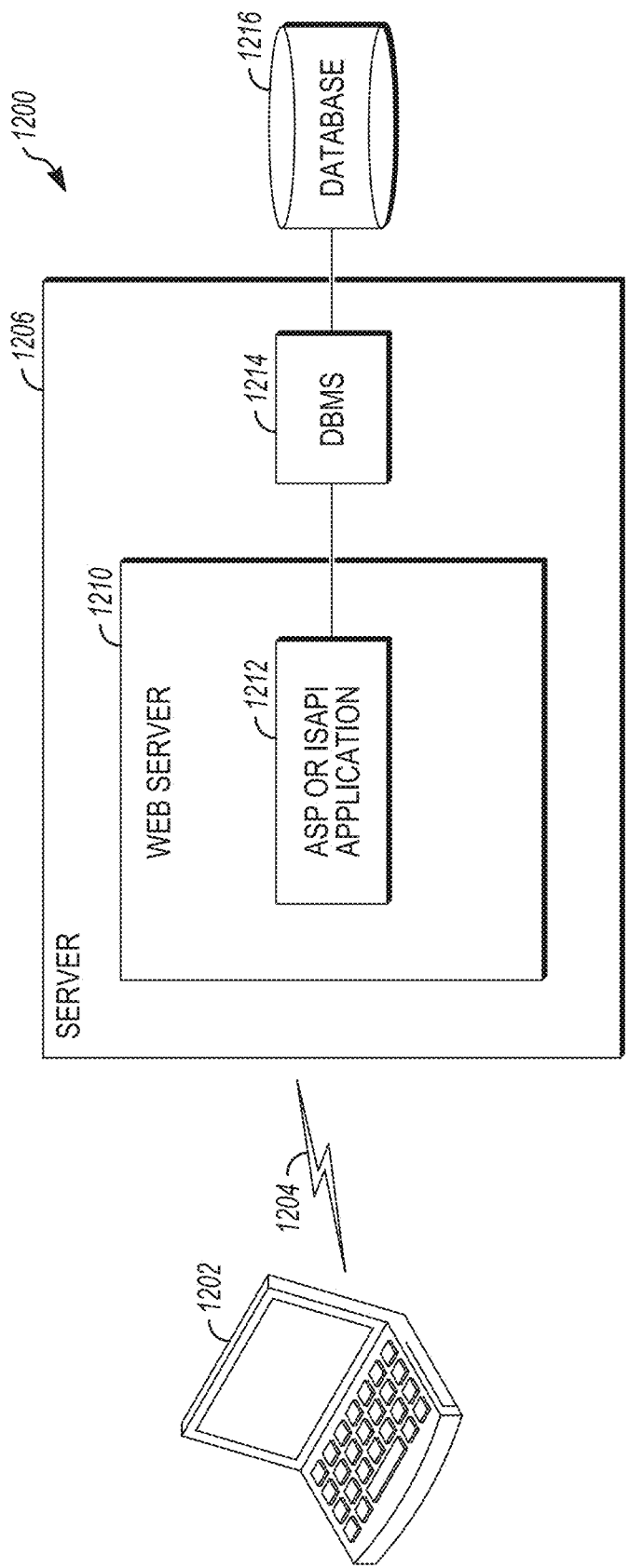
FIG. 12 schematically illustrates a typical distributed/cloud-based computer system in accordance with one or more embodiments of the invention.

FIG. 12 schematically illustrates a typical distributed/cloud-based computer system 1200 using a network 1204 to connect client computers 1202 to server computers 1206. A typical combination of resources may include a network 1204 comprising the Internet, LANs (local area networks), WANs (wide area networks), SNA (systems network architecture) networks, or the like, clients 1202 that are personal computers or workstations (as set forth in FIG. 11), and servers 1206 that are personal computers, workstations, minicomputers, mainframes, or cloud servers (as set forth in FIG. 11). However, it may be noted that different networks such as a cellular network (e.g., GSM [global system for mobile communications] or otherwise), a satellite based network, or any other type of network may be used to connect clients 1202 and servers 1206 in accordance with embodiments of the invention.

A network 1204 such as the Internet connects clients 1202 to server computers 1206. Network 1204 may utilize ethernet, coaxial cable, wireless communications, radio frequency (RF), etc. to connect and provide the communication between clients 1202 and servers 1206. Further, in a cloud-based computing system, resources (e.g., storage, processors, applications, memory, infrastructure, etc.) in clients 1202 and server computers 1206 may be shared by clients 1202, server computers 1206, and users across one or more networks. Resources may be shared by multiple users and can be dynamically reallocated per demand. In this regard, cloud computing may be referred to as a model for enabling access to a shared pool of configurable computing resources.

Clients 1202 may execute a client application or web browser and communicate with server computers 1206 executing web servers 1210. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1202 may be downloaded from a server computer 1206 to client computers 1202 and installed as a plug in or executed through the use of scripting tools, such as JavaScript, Express.js, Node.js, Socket.io and more. Accordingly, clients 1202 may utilize these tools and related graphics tools to provide a user interface on a display of client 1202. The web server 1210 is typically a program such as Nginx, Apache, Cloudflare, Microsoft Web Server, or otherwise.

Web server 1210 may host web pages implemented through the use of scripting tools, which may execute on the client machine (e.g., in an Active Server Page (ASP) or Internet Server Application Programming Interface (ISAPI) application 1212). The scripts invoke objects that execute business logic (referred to as business objects). The business objects then manipulate data in database 1216 through a database management system (DBMS) 1214. Alternatively, database 1216 may be part of, or connected directly to, client 1202 instead of communicating/obtaining the information from database 1216 across network 1204.

Generally, these components 1200-1216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1202 and 1206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1202 and 1206. Embodiments of the invention are implemented as a software application on a client 1202 or server computer 1206. This application may include the use of precision agriculture, robotics, autonomy, artificial intelligence, swarm management, and more. Further, as described above, the client 1202 or server computer 1206 may comprise a thin client device or a portable device that has a multi-touch-based display.

CONCLUSION

This concludes the description of the preferred embodiment of the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for managing an orchard comprising:
    (a) capturing sensor data that represents a first state of the orchard, via one or more sensors, wherein the sensor data is captured as one or more robots, that are equipped with the one or more sensors, are traveling through the orchard;
    (b) a computer server maintaining an almanac, wherein:
        (i) the almanac comprises:
            (1) a state library of sequential states of a representative orchard;
            (2) a task library for one or more tasks to be performed to transition between the sequential states;
        (ii) the maintaining comprises:
            (1) ingesting the first state of the orchard;
            (2) training, via the computer server, an orchard model, wherein the orchard model is a machine learning model that determines and manages the sequential states of the orchard, based on the sensor data; and
            (3) using the trained orchard model to determine a subsequent state of the sequential states to transition to from the first state, wherein the machine learning:
                (A) recursively updates the orchard model based on prior transitions between the sequential states; and
                (B) generates a structural computer representation of a physical structure of a plant in the orchard, wherein the physical structure comprises physical parameters of the physical plant, wherein the physical parameters comprise a limb length, limb thickness, and limb children, and wherein a limb refers to a root, a trunk, a branch, a fruit, or a leaf of the physical plant;
    (c) the computer server querying the almanac to identify a first task of the one or more tasks, wherein the first task is based on the structural computer representation, and allocating the first task to the one or more robots; and
    (d) the one or more robots receiving the first task from the computer server, and the one or more robots performing the first task.

2. The computer-implemented method of claim 1, wherein the capturing data further comprises:
    capturing environmental data;
    capturing economic data; and
    combining the sensor data with the environmental data and the economic data to represent the first state of the orchard.

3. The computer-implemented method of claim 1, wherein the using the machine learning further comprises:
    predicting a yield quality of the plant based on the structural computer representation, the orchard model, and prior state transitions.

4. The computer-implemented method of claim 1, wherein the generating the structural computer representation comprises:
    applying a convolutional neural network (CNN) to classify parts of the plant using three-dimensional (3D) data; and
    applying tree structural heuristics to constrain the structural computer representation.

5. The computer-implemented method of claim 1, wherein the using the machine learning further comprises:
    generating a structural computer representation of the physical structure of the plant in the orchard; and
    ingesting nutritional data collected from the orchard;
    ingesting water data collected from the orchard;
    predicting, based on prior state transitions, a yield quality of the plant based on the structural computer representation, the orchard model, the nutritional data and the water data;
    based on the predicting, determining a nutrition and water to be applied to the plant to maximize yield.

6. The computer-implemented method of claim 1, wherein the using the machine learning further comprises:
    generating a structural computer representation of the physical structure of the plant in the orchard, wherein the structural representation comprises young fruit; and
    evaluating, based on prior state transitions, the young fruit in the structural representation to determine interactions that result in a reduced yield throughout growth of the plant;
    based on the evaluating, determining fruit spacing on the plant.

7. The computer-implemented method of claim 6, wherein the evaluating comprises:
    predicting, using a neural-network, future fruit growth based on neighboring fruit, visual health indicators, and historical environmental data.

8. The computer-implemented method of claim 7, wherein the neural-network is trained based on gradient descent and past fruit growth.

9. The computer-implemented method of claim 1, wherein the using the machine learning further comprises:

generating a pattern representing a placement of plants in the orchard;

evaluating, based on prior state transitions, the pattern to determine a maximum yield throughout growth of the plants; and based on the evaluating, determining an updated pattern for spacing the plants in the orchard.

10. The computer-implemented method of claim 9, wherein:

the pattern comprises a tiled hexagonal pattern;

the one or more robots navigate the tiled hexagonal pattern along three (3) axes of the hexagon.

11. The computer-implemented method of claim 1, further comprising:

dividing the first task into multiple subtasks based on a sum of a cost of the multiple subtasks.

12. The computer-implemented method of claim 1, further comprising:

dividing the first task into multiple subtasks based on rows of the orchard and heuristics.

13. The computer-implemented method of claim 1, further comprising dividing the first task into multiple subtasks based on a spacing between rows of the orchard and a spacing between multiple robots of the one or more robots.

14. The computer-implemented method of claim 1, wherein:

the one or more robots comprise a transport robot and a harvest robot;

the method further comprises dividing the first task into multiple subtasks that are assigned to the transport robot and the harvest robot;

the transport robot transports bins to and from a hub to a logistics yard;

the harvest robot transports bins from plants in the orchard to and from the hub; and each hub maintains a buffer of one or more bins.

15. The computer-implemented method of claim 1, wherein:

the method further comprises dividing the first task into multiple subtasks based on clumps of plants in the orchard;

prioritization is assigned based on a sparsity of the plants within the clumps.

16. The computer-implemented method of claim 1, further comprising:

dividing the first task into multiple subtasks based on clumps of fruit in the orchard.

17. The computer-implemented method of claim 1, wherein:

the first task comprises multiple subtasks that are allocated to different robots of the one or more robots the allocation is based on:

an estimate of task cost on a per-robot basis, wherein the task cost is further based on an ability of each of the one or more robots to complete the first task.

18. A computer-implemented method for managing an orchard comprising:

(a) capturing sensor data that represents a first state of the orchard, via one or more sensors, wherein the sensor data is captured as one or more robots, that are equipped with the one or more sensors, are traveling through the orchard;

(b) a computer server maintaining an almanac, wherein:

(i) the almanac comprises:

(1) a state library of sequential states of a representative orchard;

(2) a task library for one or more tasks to be performed to transition between the sequential states;

(3) a model of the orchard and a plant in the orchard;

(ii) the maintaining comprises:

(1) ingesting the first state of the orchard;

(2) training, via the computer server, an orchard model, wherein the orchard model is a machine learning model that determines and manages the sequential states of the orchard, based on the sensor data; and (3) using the trained orchard model to determine a subsequent state of the sequential states to transition to from the first state, wherein the machine learning:

(A) recursively updates the orchard model based on prior transitions between the sequential states; and (B) generates a structural computer representation of a physical structure of the plant in the orchard, wherein the physical structure comprises physical parameters of the physical plant, wherein the physical parameters comprise a limb length, limb thickness, and limb children, and wherein a limb refers to a root, a trunk, a branch, a fruit, or a leaf of the physical plant;

(c) the computer server querying the model in the almanac to identify a first task of the one or more tasks, wherein the first task is based on the structural computer representation;

(d) the one or more robots receiving and performing the first task; and (e) monitoring results of the first task on the orchard through a graphical user interface.

\* \* \* \* \*